(12) United States Patent
Yamaguchi et al.

(10) Patent No.: US 9,903,314 B2
(45) Date of Patent: Feb. 27, 2018

(54) CARBURETOR FOR STRATIFIED SCAVENGING TWO-STROKE ENGINE

(71) Applicant: Yamabiko Corporation, Tokyo (JP)

(72) Inventors: Shirou Yamaguchi, Tokyo (JP); Takamasa Otsuji, Tokyo (JP)

(73) Assignee: Yamabiko Corporation, Tokyo (JP)

( * ) Notice: Subject to any disclaimer, the term of this patent is extended or adjusted under 35 U.S.C. 154(b) by 258 days.

(21) Appl. No.: 14/715,623

(22) Filed: May 19, 2015

(65) Prior Publication Data
US 2015/0337764 A1    Nov. 26, 2015

(30) Foreign Application Priority Data
May 21, 2014 (JP) .................................. 2014-105689

(51) Int. Cl.
*F02M 17/12* (2006.01)
*F02M 35/10* (2006.01)
*F02B 17/00* (2006.01)
*F02B 25/02* (2006.01)
*F02B 25/16* (2006.01)
(Continued)

(52) U.S. Cl.
CPC ............ *F02M 17/12* (2013.01); *F02B 17/00* (2013.01); *F02B 25/02* (2013.01); *F02B 25/16* (2013.01); *F02B 25/20* (2013.01); *F02B 25/22* (2013.01); *F02M 11/02* (2013.01); *F02M 19/00* (2013.01); *F02M 35/1019* (2013.01); *F02M 35/10196* (2013.01); *F02M 35/10262* (2013.01);
(Continued)

(58) Field of Classification Search
CPC ....... F02M 35/10262; F02M 35/10255; F02M 17/12; F02M 35/101; F02M 35/1019; F02M 19/00; F02M 11/02; F02M 35/108; F02B 75/021; F02B 25/02; F02B 17/00; F02B 25/20; F02B 25/22; F02B 25/16; F02B 63/02
See application file for complete search history.

(56) References Cited

U.S. PATENT DOCUMENTS 3,171,868 A * 3/1965 Hamilton .................. F02M 1/10
                                                       236/92 D
6,000,369 A * 12/1999 Koizumi ................ F02M 17/04
                                                       123/179.16
(Continued)

FOREIGN PATENT DOCUMENTS

DE        1928925 A1 * 12/1970 ............... F02M 1/00
DE        3130576 A1 *  2/1983 ............... F02D 11/08
(Continued)

*Primary Examiner* — Amber R Orlando
*Assistant Examiner* — Stephen Hobson
(74) *Attorney, Agent, or Firm* — Kilyk & Bowersox, P.L.L.C.

(57) ABSTRACT

The present invention is to prevent mixing of fresh air and an air-fuel mixture when a throttle valve is fully opened and increase a delivery ratio. A main nozzle (30) is surrounded by a tunnel-like air flow guiding member (52). The air flow guiding member (52) is opened at its front and back sides. A whole amount of fuel discharged via a main nozzle (30) is sent to a downstream side by an air flow created by the air flow guiding member (52). When a throttle valve (22) and a choke valve (24) are both in a fully-opened state, fresh air flows into an air-fuel mixture passage (12) through a gap between these valves (22, 24).

10 Claims, 20 Drawing Sheets

(51) Int. Cl.
*F02B 25/20* (2006.01)
*F02B 25/22* (2006.01)
*F02M 11/02* (2006.01)
*F02M 19/00* (2006.01)
*F02M 35/108* (2006.01)
*F02B 63/02* (2006.01)

(52) U.S. Cl.
CPC ............ *F02B 63/02* (2013.01); *F02M 35/108* (2013.01); *F02M 35/10255* (2013.01); *Y02T 10/146* (2013.01)

(56) References Cited

U.S. PATENT DOCUMENTS

| | | | | |
|---|---|---|---|---|
| 6,289,856 | B1 * | 9/2001 | Noguchi | F02B 25/16 123/73 PP |
| 6,435,482 | B1 * | 8/2002 | Omi | F02M 5/12 261/70 |
| 6,634,326 | B2 * | 10/2003 | Radel | F02B 25/22 123/73 A |
| 7,011,298 | B2 * | 3/2006 | Gerhardy | F02D 9/1045 123/73 PP |
| 7,100,551 | B2 | 9/2006 | Rosskamp | |
| 7,819,391 | B2 * | 10/2010 | Glover | F02B 25/22 123/73 PP |
| 7,922,154 | B2 * | 4/2011 | Soderquist | F16K 27/0218 123/73 PP |
| 8,100,384 | B1 * | 1/2012 | Hall | F02M 15/00 261/144 |
| 8,894,735 | B2 * | 11/2014 | Yamazaki | F02M 35/1019 123/198 E |
| 9,353,675 | B2 * | 5/2016 | Grether | F02B 33/04 |
| 2002/0139326 | A1 * | 10/2002 | Araki | F02B 25/22 123/73 PP |
| 2005/0120985 | A1 * | 6/2005 | Rosskamp | F02B 25/22 123/73 PP |
| 2005/0172924 | A1 * | 8/2005 | Simon | F02M 35/10019 123/184.23 |
| 2005/0188952 | A1 * | 9/2005 | Prager | F02D 9/1045 123/337 |
| 2006/0163755 | A1 * | 7/2006 | Prager | F02B 25/22 261/46 |
| 2006/0219194 | A1 * | 10/2006 | Geyer | F02B 25/22 123/73 A |
| 2007/0257379 | A1 * | 11/2007 | Mason | F02M 7/00 261/44.6 |
| 2009/0013963 | A1 * | 1/2009 | Eberhardt | F02B 25/14 123/337 |
| 2009/0228189 | A1 * | 9/2009 | Zurcher | F02B 25/20 701/103 |
| 2009/0320792 | A1 * | 12/2009 | Kashima | F01L 1/053 123/347 |
| 2010/0242904 | A1 * | 9/2010 | Hoche | F02B 31/08 123/337 |
| 2012/0146249 | A1 * | 6/2012 | Sugishita | F02B 25/22 261/61 |
| 2012/0152216 | A1 * | 6/2012 | Grether | F02B 25/20 123/65 P |
| 2013/0228152 | A1 * | 9/2013 | Ono | F02M 9/08 123/319 |
| 2014/0299099 | A1 * | 10/2014 | Yoshizaki | F02M 7/10 123/438 |
| 2015/0337764 | A1 * | 11/2015 | Yamaguchi | F02M 19/00 261/42 |
| 2015/0337765 | A1 * | 11/2015 | Yamazaki | F02M 35/1019 123/73 A |
| 2016/0312737 | A1 * | 10/2016 | Yamaguchi | F02B 63/02 |

FOREIGN PATENT DOCUMENTS

| | | | | |
|---|---|---|---|---|
| DE | 3347112 | A1 * | 7/1984 | ............ F02B 23/08 |
| DE | 10133942 | A1 * | 1/2002 | ............ F02B 29/083 |
| DE | 10314236 | A1 * | 11/2004 | ............ F02B 29/083 |
| DE | 102006024079 | A1 * | 11/2007 | ............ F02M 1/02 |
| EP | 0054964 | A1 * | 6/1982 | ............ F01L 1/44 |
| EP | 1201912 | A2 * | 5/2002 | ............ F02M 25/024 |
| EP | 1219812 | A2 * | 7/2002 | ............ F02B 31/04 |
| FR | 2893987 | A1 * | 6/2007 | ............ F02B 31/08 |
| JP | 6033736 | B | 5/1994 | |
| JP | 3209036 | B2 * | 9/2001 | ............ F02B 31/085 |
| JP | 4500198 | B2 * | 7/2010 | ............ F02D 9/1095 |
| JP | 2014111942 | A * | 6/2014 | |
| WO | WO-2004040130 | A1 * | 5/2004 | ............ F02M 69/047 |
| WO | WO-2006123819 | A1 * | 11/2006 | ............ F02D 9/1055 |

* cited by examiner (B)

(A)

CARBURETOR FOR STRATIFIED SCAVENGING TWO-STROKE ENGINE

CROSS-REFERENCE TO RELATED APPLICATIONS

The present application claims priority from Japanese Patent Application No. 2014-105689, filed May 21, 2014, which is incorporated herein by reference.

FIELD OF THE INVENTION

The present invention relates to a stratified scavenging two-stroke internal-combustion engine, and in particular to a carburetor incorporated in a stratified scavenging engine. The present invention typically relates to a single-cylinder engine mounted in a portable working machine such as a bush cutter, a chain saw, and a power blower and a carburetor incorporated in the single-cylinder engine.

BACKGROUND OF THE INVENTION

U.S. Pat. No. 7,100,551 B2 discloses a carburetor that is incorporated in a stratified scavenging two-stroke engine. Two-stroke internal-combustion engines of stratified scavenging type are described in detail in Japanese Patent Laid-Open No. JP2002-227653 and International Publication No. WO 98/57053.

A stratified scavenging two-stroke engine introduces leading air into a combustion chamber at an early stage of a scavenging stroke, then introduces an air-fuel mixture into the combustion chamber to perform a scavenging process. A carburetor incorporated in the stratified scavenging type engine includes a fresh air passage supplying air filtered by an air cleaner to an engine body, and an air-fuel mixture passage creating an air-fuel mixture to supply the air-fuel mixture to the engine body (crankcase) when a throttle valve is in a fully-opened state (high speed operation state). The fresh air passage in the carburetor is connected via a piston groove or a reed valve to a scavenging passage communicating with the crankcase and the combustion chamber.

For a stratified scavenging engine, it is desirable that the whole amount of the air-fuel mixture created by the air-fuel mixture passage in the carburetor fills the crankcase of the engine body in a high-speed operation in which the throttle is fully opened. It is also desirable that fresh air that does not contain fuel component fills the upper portion of the above-described scavenging passage, the amount of fresh air being corresponding to the amount of blow-by of unburnt gas.

FIG. 20 illustrates a conventional and typical carburetor, focusing on a portion including a throttle valve (in a fully-opened state), in which FIG. 20(A) is a plan view and FIG. 20(B) is a longitudinal sectional view. In these figures, the reference numeral 900 denotes a carburetor, the reference numeral 902 denotes an intake air passage, the reference numeral 904 denotes a throttle valve, and the reference numeral 904a denotes a throttle valve shaft.

Referring to FIG. 20(B), a fresh air passage 906 is formed on one side of the throttle valve 904 and an air-fuel mixture passage 908 on the other side of the throttle valve 904 in the intake air passage 902, the side being defined by the throttle valve 904, when the throttle valve 904 is in its fully-opened state. On the side of the air-fuel mixture passage 908, there is provided a main nozzle or a main port 910, and an air-fuel mixture is created by the fuel discharged from the main nozzle or the main port 910.

In the figure, the arrow A denotes a flow direction of gas in the intake air passage 902. In addition, the reference numeral 912 denotes a well-known venturi section.

Referring to FIG. 20(A), when the throttle valve 904 in the fully-opened state is viewed in its plan view, while the throttle valve 904 is in the fully-opened state (high-speed operation), it is desirable to prevent mixing of the air-fuel mixture and the fresh air around the region indicated by the shaded portion of the throttle valve 904.

U.S. Pat. No. 7,100,551 B2 discloses two types of carburetors. The carburetor of one type is a carburetor that only incorporates a throttle valve and does not include a choke valve. The carburetor of the other type is a carburetor that incorporates a throttle valve and a choke valve. In these two types of the carburetors, an intake air passage in the carburetors is divided into a fresh air passage and an air-fuel mixture passage when the throttle valve is in a fully-opened state. The fresh air passage supplies air filtered by an air cleaner to the engine body (upper portion of the scavenging passage) via a piston groove. The air-fuel mixture passage supplies an air-fuel mixture created in this air-fuel mixture passage to the engine body (crankcase).

With reference made, as an exemplary one, to the carburetor illustrated in FIG. 3 of U.S. Pat. No. 7,100,551 B2, the carburetor includes a choke valve and a throttle valve. Inside of the carburetor, there is provided a first partition arranged on an upstream side of the choke valve. In addition, a second partition is provided on a downstream side of the throttle valve. Further, a third intermediate partition is provided between the first partition and the second partition. These first to third partitions reside on the same plane with respect to the choke valve and the throttle valve that are both in the fully-opened state.

The end faces of the first to third partitions, in other words, the end faces facing the choke valve or the throttle valve, have a circular arc shape. Specifically, the circular arc shape is a complementary shape with respect to the circular shape of the outer peripheral edge of the choke valve or the throttle valve.

According to the carburetor disclosed by U.S. Pat. No. 7,100,551 B2, it is made possible to physically partition the intake air passage of the carburetor into the above-described fresh air passage and the air-fuel mixture passage by reducing the clearance between each of the edges of the first to third partitions and the outer peripheral edges of the choke valve and the throttle valve, and by virtue of the choke valve and the throttle valve that are both in the fully-opened state, and thereby prevent mixing of the air and the air-fuel mixture.

SUMMARY OF THE INVENTION

Problems to be Solved by the Invention

According to the carburetor of U.S. Pat. No. 7,100,551 B2, when the clearance between each of the edges of the first to third partitions and the outer peripheral edges of the choke valve and the throttle valve is designed to be small to the extreme, the full amount of the air-fuel mixture created in the air-fuel mixture passage in the carburetor is allowed to fill the engine body (crankcase).

However, as the design value of the above-described clearance is made smaller, manufacturing of the carburetor also becomes more difficult. In other words, there is a drawback that due to manufacturing errors, the partition may interfere with the throttle valve or the like. In order to avoid this drawback, when the design value of the above-described clearance is made larger, then there will be another drawback of mixing of the air-fuel mixture and the fresh air due to the clearance.

Each of the choke valve and the throttle valve has an shaft, and the choke valve and the throttle valve are opened and closed by virtue of rotation of respective shafts. In general, the diameter of the shaft is larger than the thickness of the choke valve and the throttle valve. This leads to unevenness on the wall surface defining the fresh air passage and the air-fuel mixture passage. In addition, the carburetor includes a venturi section and a main nozzle, and elements such as the venturi section and the main nozzle causes unevenness on the surface defining the fresh air passage and the air-fuel mixture passage. This unevenness is a factor that causes disturbance of the flow of air flowing in the fresh air passage and the air-fuel mixture passage.

An object of the present invention is to provide a stratified scavenging engine and a carburetor that is incorporated therein, the engine and the carburetor being capable of reducing mixing of the fresh air and the air-fuel mixture when the throttle valve is fully opened and increasing a delivery ratio of the engine.

Means for Solution of the Problems

According to the present invention, the above object is achieved by providing a carburetor for a stratified scavenging engine, the carburetor including:

an intake air passage configured to receive air filtered by an air cleaner and create an air-fuel mixture;

a throttle valve arranged in the intake air passage, the throttle valve being configured by a butterfly valve, wherein, in response to the throttle valve being placed in a fully-opened state, a fresh air passage and an air-fuel mixture passage are formed by the throttle valve, air coming out of the fresh air passage being supplied to an upper portion of a scavenging passage of the stratified scavenging engine, and an air-fuel mixture coming out of the air-fuel mixture passage being supplied to a crankcase of the stratified scavenging engine; and an air flow guiding member configured to adjust a flow of gas passing through the fresh air passage and/or the air-fuel mixture passage and direct the flow of gas toward a downstream side.

The carburetors for a stratified scavenging engine include a first type incorporating a choke valve and a throttle valve that are both configured by a butterfly valve, and a second type that only incorporates a throttle valve and does not include a choke valve. The present invention can be applied to both of the carburetors of the first type and the second type.

In the carburetor according to the present invention, typically, the above-described air flow guiding member is arranged in the above-described air-fuel mixture passage. Typically, the air flow guiding member has a tunnel shape extending in the gas flow direction. Any cross section of the tunnel may be employed as appropriate. The inlet and the outlet of the tunnel may have the same size, but it is desirable that the outlet is smaller than the inlet.

The advantageous effects and other objects of the present invention will become apparent from reading of preferred embodiments of the present invention.

BRIEF DESCRIPTION OF THE DRAWINGS

FIG. 3 illustrates a carburetor according to a first embodiment, in which FIG. 3(A) is a longitudinal sectional view of the carburetor and FIG. 3(B) is an end view of the carburetor viewed from an upstream side;

FIG. 4 illustrates a carburetor according to a second embodiment, in which FIG. 4(A) is a longitudinal sectional view of the carburetor and FIG. 4(B) is an end view of the carburetor viewed from the upstream side;

FIG. 5 illustrates a carburetor according to a third embodiment, in which FIG. 5(A) is a longitudinal sectional view of the carburetor and FIG. 5(B) is an end view of the carburetor viewed from the upstream side;

FIG. 6 illustrates a carburetor according to a fourth embodiment, in which FIG. 6(A) is a longitudinal sectional view of the carburetor and FIG. 6(B) is an end view of the carburetor viewed from the upstream side;

FIG. 7 illustrates a carburetor according to a fifth embodiment, in which FIG. 7(A) is a longitudinal sectional view of the carburetor and FIG. 7(B) is an end view of the carburetor viewed from the upstream side;

FIG. 8 illustrates a carburetor according to a sixth embodiment, in which FIG. 8(A) is a longitudinal sectional view of the carburetor and FIG. 8(B) is an end view of the carburetor viewed from the upstream side;

FIG. 9 illustrates a carburetor according to a seventh embodiment, in which FIG. 9(A) is a longitudinal sectional view of the carburetor and FIG. 9(B) is an end view of the carburetor viewed from the upstream side;

FIG. 10 illustrates a carburetor according to an eighth embodiment, in which FIG. 10(A) is a longitudinal sectional view of the carburetor and FIG. 10(B) is an end view of the carburetor viewed from the upstream side;

FIG. 11 illustrates a carburetor according to a ninth embodiment, in which FIG. 11(A) is a longitudinal sectional view of the carburetor and FIG. 11(B) is an end view of the carburetor viewed from the upstream side;

FIG. 12 illustrates a carburetor according to a tenth embodiment, in which FIG. 12(A) is a longitudinal sectional view of the carburetor and FIG. 12(B) is an end view of the carburetor viewed from the upstream side;

FIG. 13 illustrates a carburetor according to an eleventh embodiment, in which FIG. 13(A) is a longitudinal sectional view of the carburetor and FIG. 13(B) is an end view of the carburetor viewed from the upstream side;

FIG. 14 illustrates a carburetor according to a twelfth embodiment, in which FIG. 14(A) is a longitudinal sectional view of the carburetor and FIG. 14(B) is an end view of the carburetor viewed from the upstream side;

FIG. 15 illustrates a carburetor according to a thirteenth embodiment, in which FIG. 15(A) is a longitudinal sectional view of the carburetor and FIG. 15(B) is an end view of the carburetor viewed from the upstream side;

FIG. 16 illustrates a carburetor according to a fourteenth embodiment, in which FIG. 16(A) is a longitudinal sectional view of the carburetor and FIG. 16(B) is an end view of the carburetor viewed from the upstream side;

FIG. 17 illustrates a carburetor according to a fifteenth embodiment, in which FIG. 17(A) is a longitudinal sectional view and FIG. 17(B) is an end view of the carburetor viewed from the upstream side;

FIG. 18 illustrates a carburetor according to a sixteenth embodiment, in which FIG. 18(A) is a longitudinal sectional view of the carburetor and FIG. 18(B) is an end view of the carburetor viewed from the upstream side;

FIG. 19 illustrates a carburetor according to a seventeenth embodiment, in which FIG. 19(A) is a longitudinal sectional view of the carburetor and FIG. 19(B) is an end view of the carburetor viewed from the upstream side; and FIG. 20 illustrates a conventional and typical carburetor, in which FIG. 20(A) is a plan view of a throttle valve in a fully-opened state and FIG. 20(B) is a longitudinal sectional view of the carburetor.

DETAILED DESCRIPTION OF THE PRESENT INVENTION

Preferred embodiments of the present invention are described below with reference to the accompanying drawings.

Figure 1:
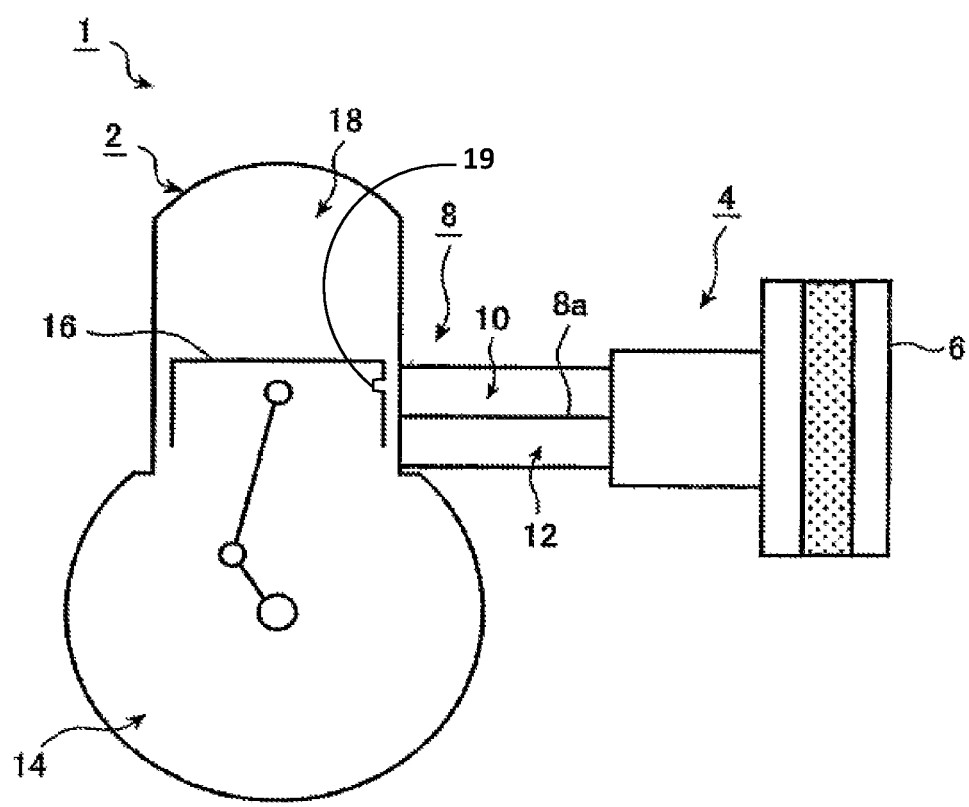
FIG. 1 is a schematic illustration of a stratified scavenging two-stroke engine that incorporates a carburetor according to the present invention.

FIG. 1 schematically illustrates a stratified scavenging two-stroke engine that incorporates a carburetor according to the present invention. An engine 1 includes a piston-valve-type engine body 2, a carburetor 4, and an air cleaner 6, and the engine body 2 and the carburetor 4 are coupled to each other via an intake member 8. The intake member 8 may be configured in its longitudinal direction as one single component, or may be configured by more than one component.

The engine body 2 is a stratified scavenging type engine. There are various specific configurations of stratified scavenging two-stroke engines. The mechanism and functionality of stratified scavenging engines are described in detail in Japanese Patent Laid-Open No. JP2002-227653 (U.S. Pat. Appln. No. 2002/139326 A1)and International Publication No. WO 98/57053, (U.S. Pat. No. 6,289,856)the contents of which are incorporated herein by reference.

The features of a stratified scavenging two-stroke engine may be summarized as follows: The stratified scavenging two-stroke engine includes, as in the case of typical two-stroke engines, a scavenging passage whose lower end communicates with a crankcase and whose upper end communicates with a combustion chamber. Further, the crankcase is filled with an air-fuel mixture. The air-fuel mixture in the crankcase is introduced via the scavenging passage into the combustion chamber.

Referring to FIG. 1 again, the intake member 8 includes a partition wall 8a extending and continuing in its longitudinal direction. The intake member 8 includes a fresh air passage 10 and an air-fuel mixture passage 12 which are partitioned by the partition wall 8a. The fresh air passage 10 can communicate with an upper portion of the above-described scavenging passage via a piston groove 19 or a reed valve. The air-fuel mixture passage 12 communicates with the crankcase 14, and the communication between the air-fuel mixture passage 12 and the crankcase 14 is controlled by a piston 16.

The engine body 2 is configured to introduce, in a scavenging stroke, leading air (fresh air) that does not contain any fuel component into the combustion chamber 18 immediately before introducing the air-fuel mixture of the crankcase 14 into a combustion chamber 18, in other words, at an early stage of the scavenging stroke.

Figure 2:
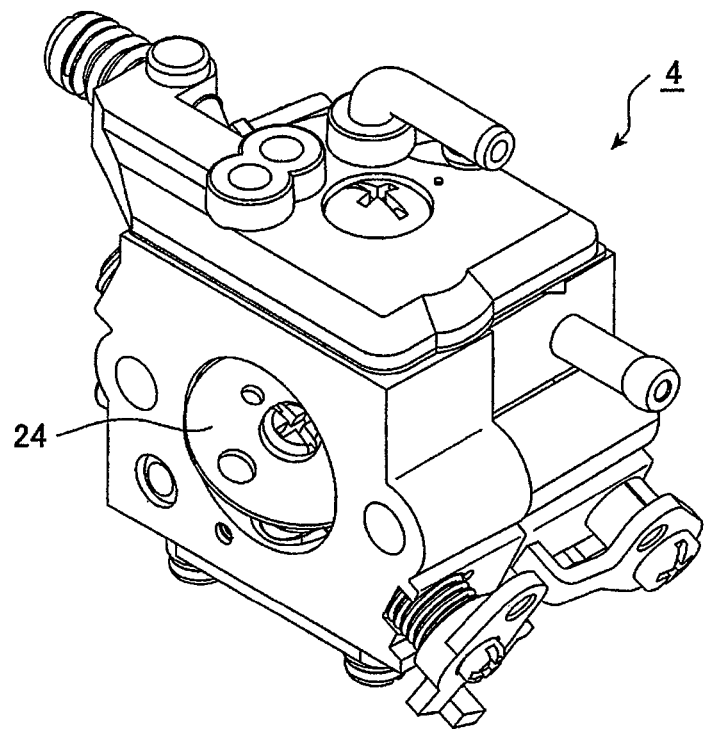
FIG. 2 is perspective view of an appearance of the carburetor according to the embodiments.

FIG. 2 is a perspective view of an appearance of the carburetor 4 according to the embodiments. Examples of portable working machines that incorporate the engine of the embodiments may include a chain saw, a trimmer, a power blower, an engine type pump, a small generator, and agrochemical sprayer, etc. Referring to FIG. 2, those skilled in the art would readily understand that the carburetor 4 is compact.

Various exemplary carburetors 4 are illustrated in FIGS. 3 to 6 in which reference numerals 401 to 404 are assigned to the carburetors 4 according to various exemplary embodiments, respectively. The carburetors 401 to 404 according to the first to fourth embodiments illustrated in FIGS. 3 to 6 include a choke valve 24 and a throttle valve 22 that are arranged in an intake air passage 20, and a venturi section 26 provided between the choke valve 24 and the throttle valve 22.

Ports that discharge fuel into the intake air passage 20 may include as in the case of a conventional carburetor, a main nozzle 30 pertaining to a main system and slow ports 32 pertaining to a slow system. The main nozzle 30 is positioned in position near the top of the venturi section 26. The main nozzle 30 may be substituted by a main port. The slow ports 32 are positioned in position near the circumference of the throttle valve 22 in its fully-closed state. The slow ports 32 comprise first to third idle ports 34-1 to 34-3.

The first idle port 34-1 is called a "primary idle port." The first idle port 34-1 is positioned on the downstream side in the direction of air flow. The third idle port 34-3 is positioned on the upstream side in the direction of air flow. The second idle port 34-2 is positioned between the first idle port 34-1 and the third idle port 34-3.

In an idle operation, the throttle valve 22 is placed in a fully-closed state. In this state, fuel is supplied via the first idle port 34-1. In a partial operation, the throttle valve 22 is placed in a half-opened state. In this state, the fuel is supplied not only via the first to third idle ports 34-1 to 34-3 but also via the main nozzle 30.

In a high-speed operation, the throttle valve 22 is placed in a fully-opened state. The high-speed operation is called "full throttle (full-open)" operation. In the high-speed operation, as in the case of the above-described partial operation, the fuel is supplied via the first to third idle ports 34-1 to 34-3 and the main nozzle 30. In the high-speed operation, a large amount of fuel is supplied to the intake air passage 20. Accordingly, in the high-speed operation, the fuel that is supplied via the main nozzle 30 positioned at the top of the venturi section 26 accounts for the primary part of the whole amount of fuel supplied to the intake air passage 20.

In the carburetors 401 to 404 according to the first to fourth embodiments illustrated in FIGS. 3 to 6, a fresh air passage 10 is formed on upper side of the intake passage 20 and an air-fuel mixture passage 12 is formed on down side of the intake passage 20 by the throttle valve 22 and the choke valve 24 that are both in the fully-opened state. The carburetors 401 to 404 according to the first to fourth embodiments include a first air flow guiding member 50 between the throttle valve 22 and the choke valve 24. The air flow guiding member 50 is arranged in the fresh air passage 10.

The first air flow guiding member 50 illustrated in FIGS. 3 to 6 includes a horizontal plate part 50a positioned above and near the throttle valve 22 in the fully-opened state. The horizontal plate part 50a is in parallel with the plate surface of the throttle valve 22 in the fully-opened state. In addition, the horizontal plate part 50a extends in a transverse direction with respect to the intake air passage 20.

In the illustrated carburetors 401 to 404, both ends of the horizontal plate part 50a in its width direction are in abutment with the wall surface defining the intake air passage 20. As a variation of the first air flow guiding member 50, the first air flow guiding member 50 may include a horizontal plate part 50a and a suspended support part 50b (indicated by virtual lines) extending upward from the both ends in the width direction of the horizontal plate part 50a.

FIGS. 3 to 6 indicate that the horizontal plate part 50a may take various length dimensions (the length defined with respect to the air flow direction A). As can be appreciated from FIGS. 3(A), 4(A), 5(A) and 6(A) illustrating the cross sections of the throttle valve 22 and the choke valve 24 that are both in the fully-opened state, the upstream end of the horizontal plate part 50a is positioned such that the upstream end does not interfere with the downstream-side edge of the choke valve 24. The horizontal plate part 50a extends to the upstream-side end of the throttle valve 22, and, in the plan view, the downstream-side end of the horizontal plate part 50a overlaps with at least the upstream-side end of the throttle valve 22.

The carburetor 401 according to the first embodiment (FIG. 3) has a length dimension such that the downstream-side end of the horizontal plate part 50a extends to the upstream-side end of the throttle valve 22. The carburetors 402 and 403 according to the second and third embodiments (FIGS. 4 and 5) have a length dimension such that the downstream-side end of the horizontal plate part 50a extends to the downstream side to a larger extent than that of the carburetor 401 according to the first embodiment. The carburetor 404 according to the fourth embodiment (FIG. 6) has a length dimension such that the downstream-side end of the horizontal plate part 50a extends to an extent that it reaches the vicinity of the throttle valve shaft 22a.

As can be appreciated from FIGS. 3(A) to 6(A), the upper surface of the plate-like horizontal plate part 50a is positioned above the throttle valve shaft 22a.

When the first air flow guiding member 50 includes the horizontal plate part 50a having its length extending in the gas flow direction A and the plate-like suspended support part 50b (indicated by virtual lines) extending upward from the both ends in the width direction of the horizontal plate part 50a, then, as can be best appreciated from FIGS. 3(A) to 6(B), the upstream-side edge of the plate-like suspended support part 50b may take an arc shape that is concave with respect to the downstream side (FIGS. 4 and 6) or may take a straight shape (FIGS. 3 and 5) such that the plate-like suspended support part 50b does not interfere with opening/closing movement of the choke valve 24.

Figure 3:
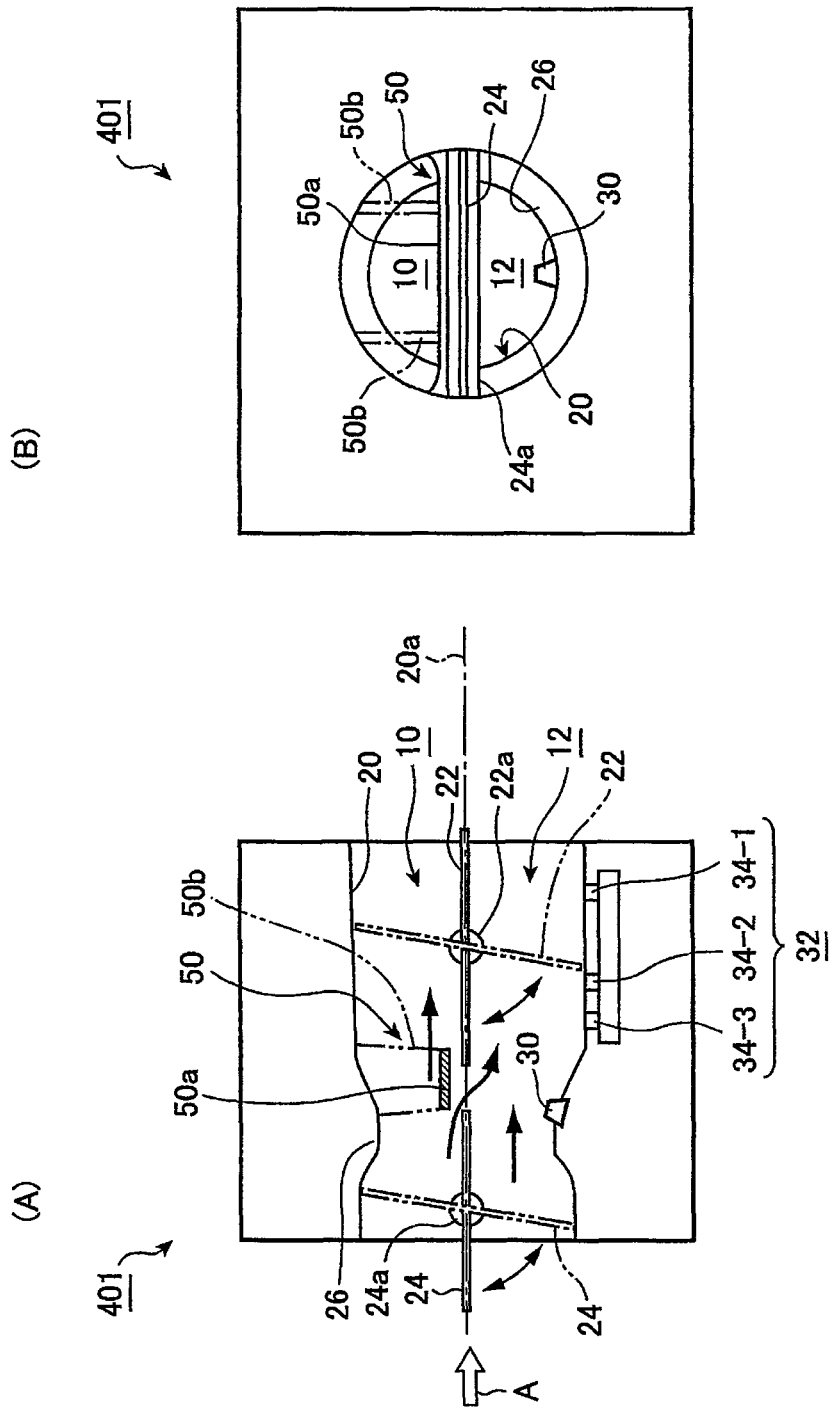
Figure 4:
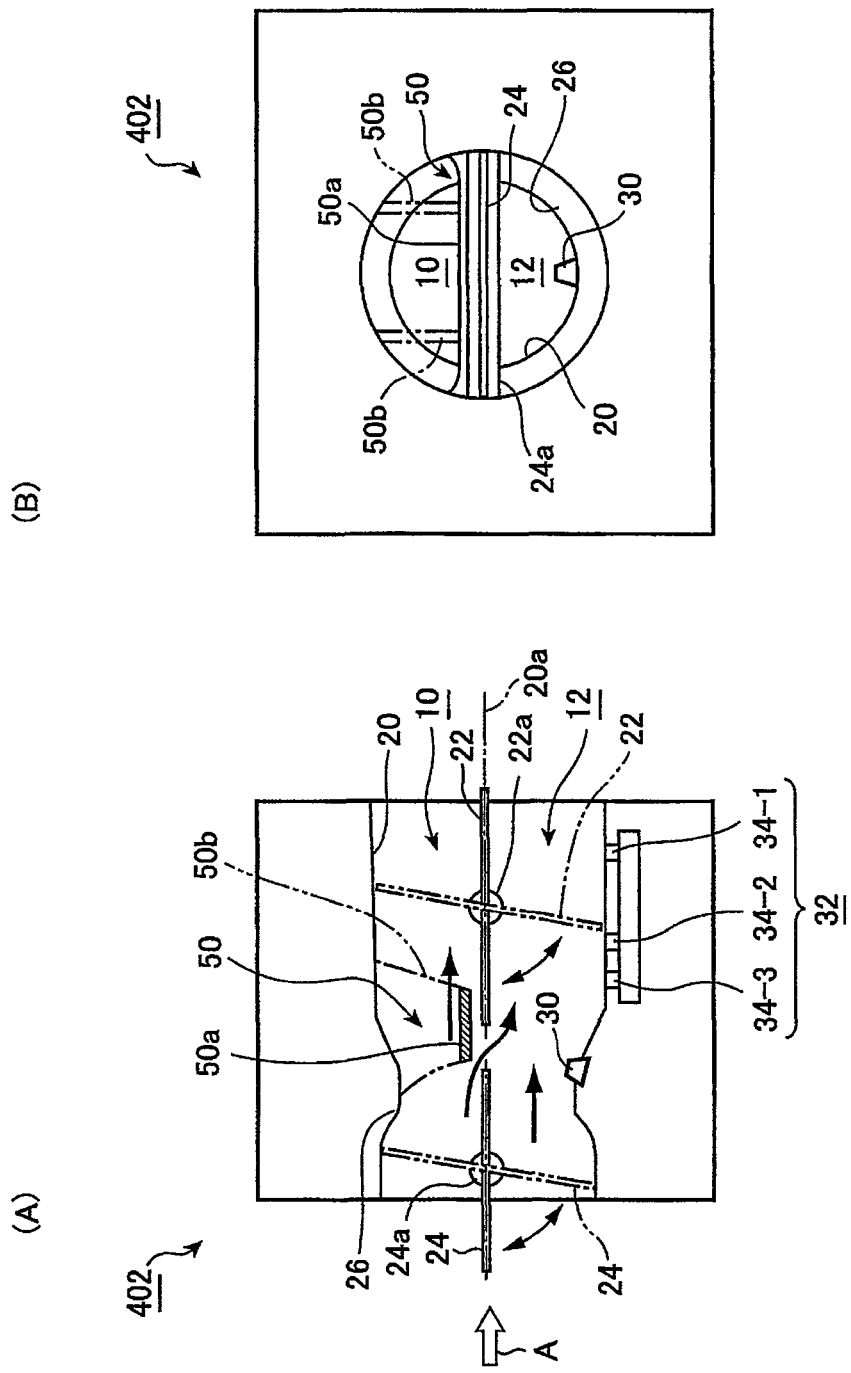
Figure 5:
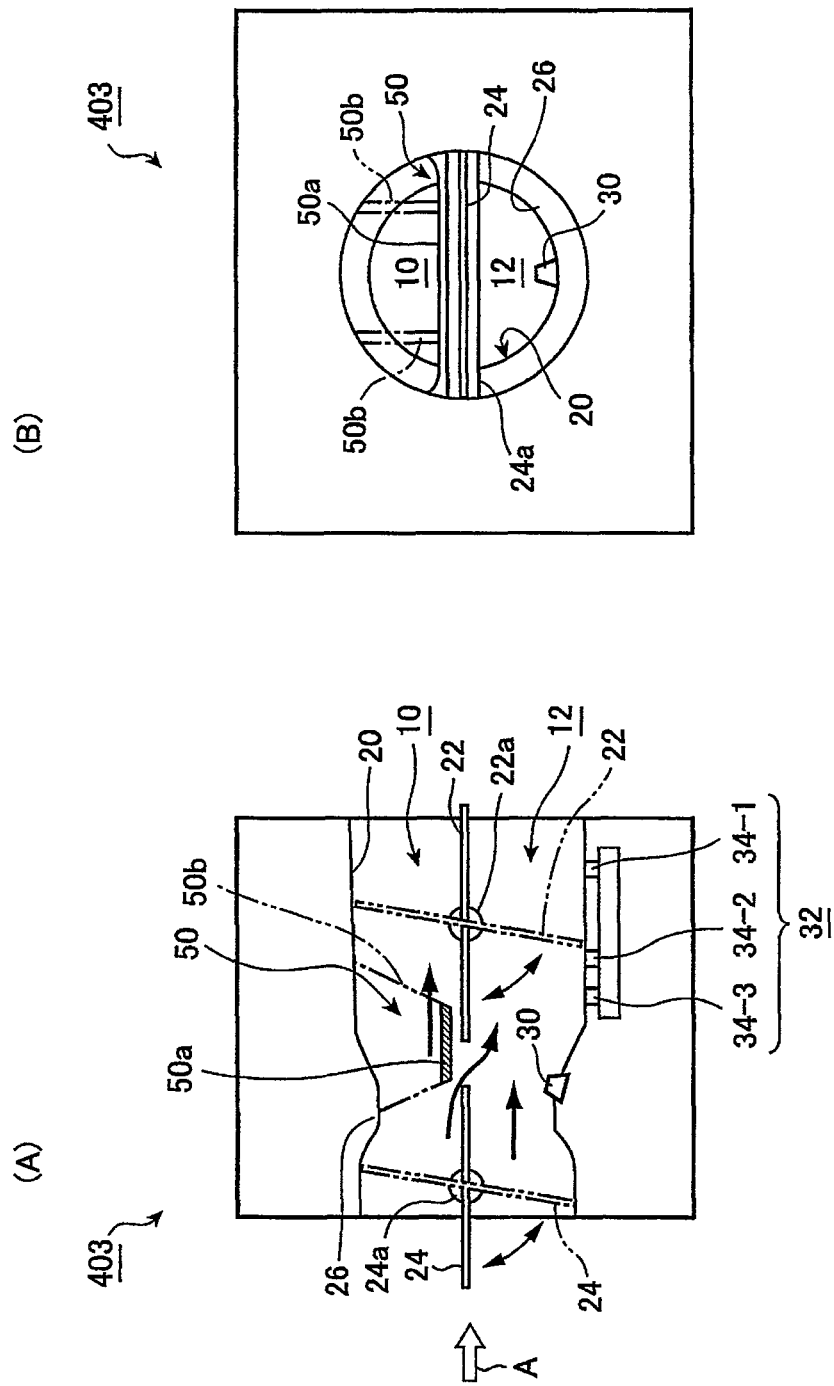
Figure 6:
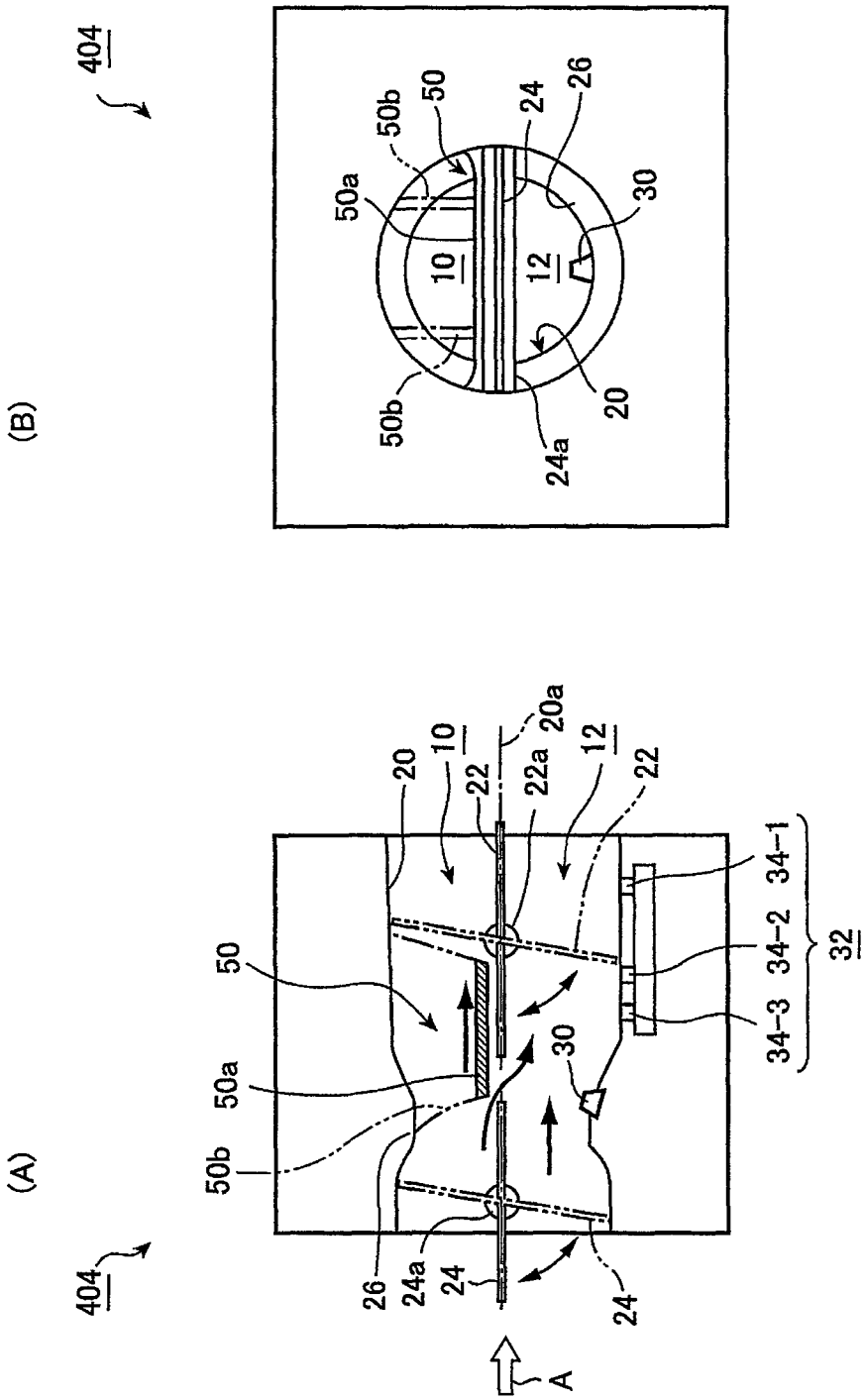

In addition, the upstream-side edge of the plate-like suspended support part 50b may have a contour shape extending from the horizontal plate part 50a and being inclined toward the upstream side (FIGS. 4 to 6), or may have a contour shape that extends upward from the horizontal plate part 50a (FIG. 3).

The downstream-side edge of the plate-like suspended support part 50b may have a contour shape extending from the horizontal plate part 50a and being inclined toward the downstream side (FIGS. 4 to 6), or may have a contour shape that extends upward from the horizontal plate part 50a (FIG. 3).

The right and left suspended support parts 50b illustrated by virtual lines in FIGS. 3(B) to 6(B) may be parallel to each other as illustrated, or may have dimensions widening upward.

According to the carburetors 401 to 404 of the first to fourth embodiments (FIGS. 3 to 6), the flow direction of the air passing through the fresh air passage 10 is adjusted to correspond to the direction along the axis 20a of the intake air passage 20 of the carburetors 401 to 404 by virtue of the horizontal plate part 50a of the first air flow guiding member 50. Since the upper surface of the horizontal plate part 50a is positioned above the throttle valve shaft 22a, the fresh air guided by the horizontal plate part 50a is allowed to be directed to the engine without being disturbed by the throttle valve shaft 22a.

In the piston-valve-type two-stroke engine body 2, the crankcase 14 is first filled with the air-fuel mixture in the process of the piston 16 leaving the bottom dead center and moving up, and then fresh air is supplied to the scavenging passage. Accordingly, in the fresh air passage 10 and the air-fuel mixture passage 12 in the carburetors 401 to 404 according to the first to fourth embodiments, the flow of air-fuel mixture is first created in the air-fuel mixture passage 12, and then the flow of air is created in the fresh air passage 10.

Referring to FIGS. 3(A) to 6(A), when the flow of the air-fuel mixture in the air-fuel mixture passage 12 is generated, air enters the air-fuel mixture passage 12 from the fresh air passage 10 via a gap between the downstream-side end of the choke valve 24 and the horizontal plate part 50a. This implies that the at least delivery ratio of the engine body 2 is increased.

Figure 7:
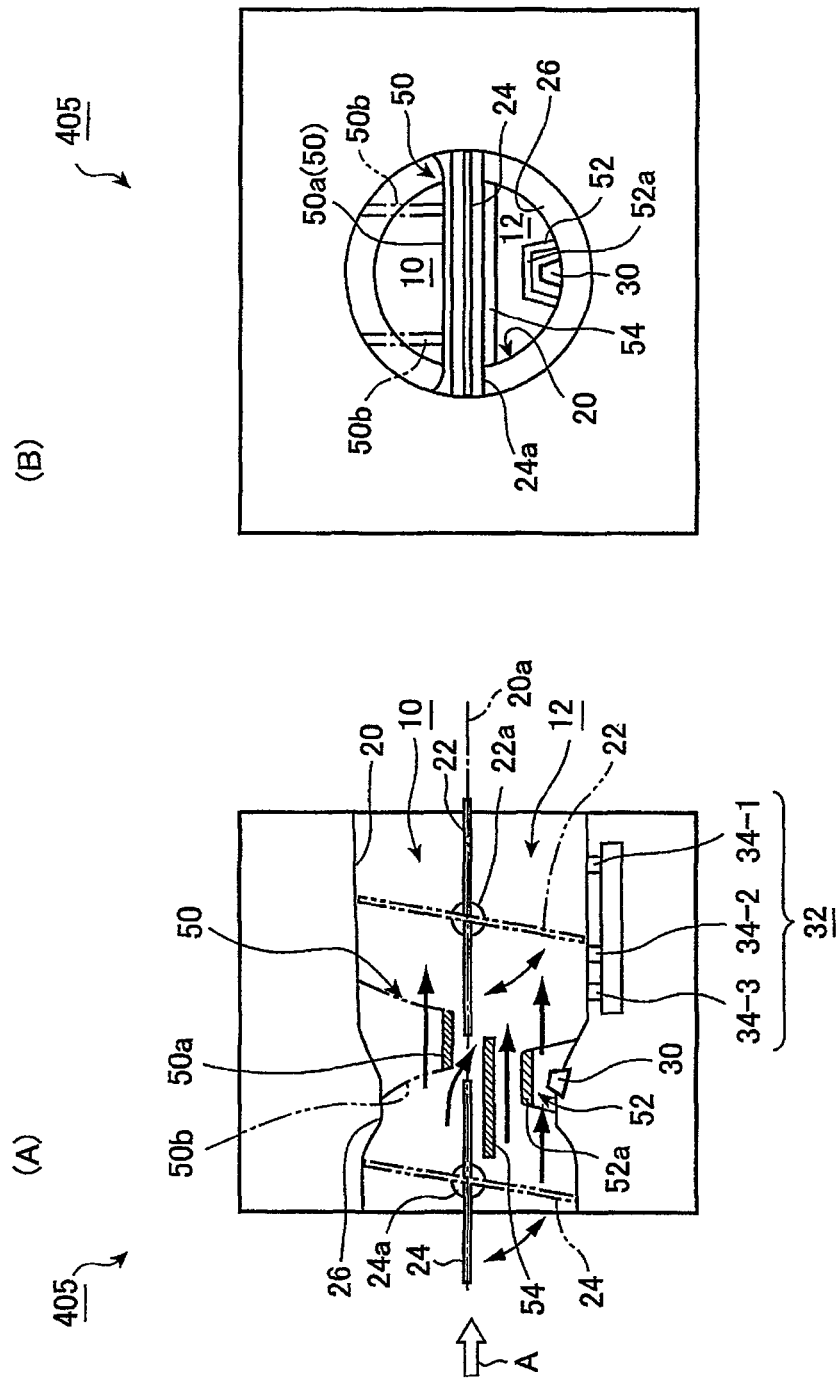
Figure 8:
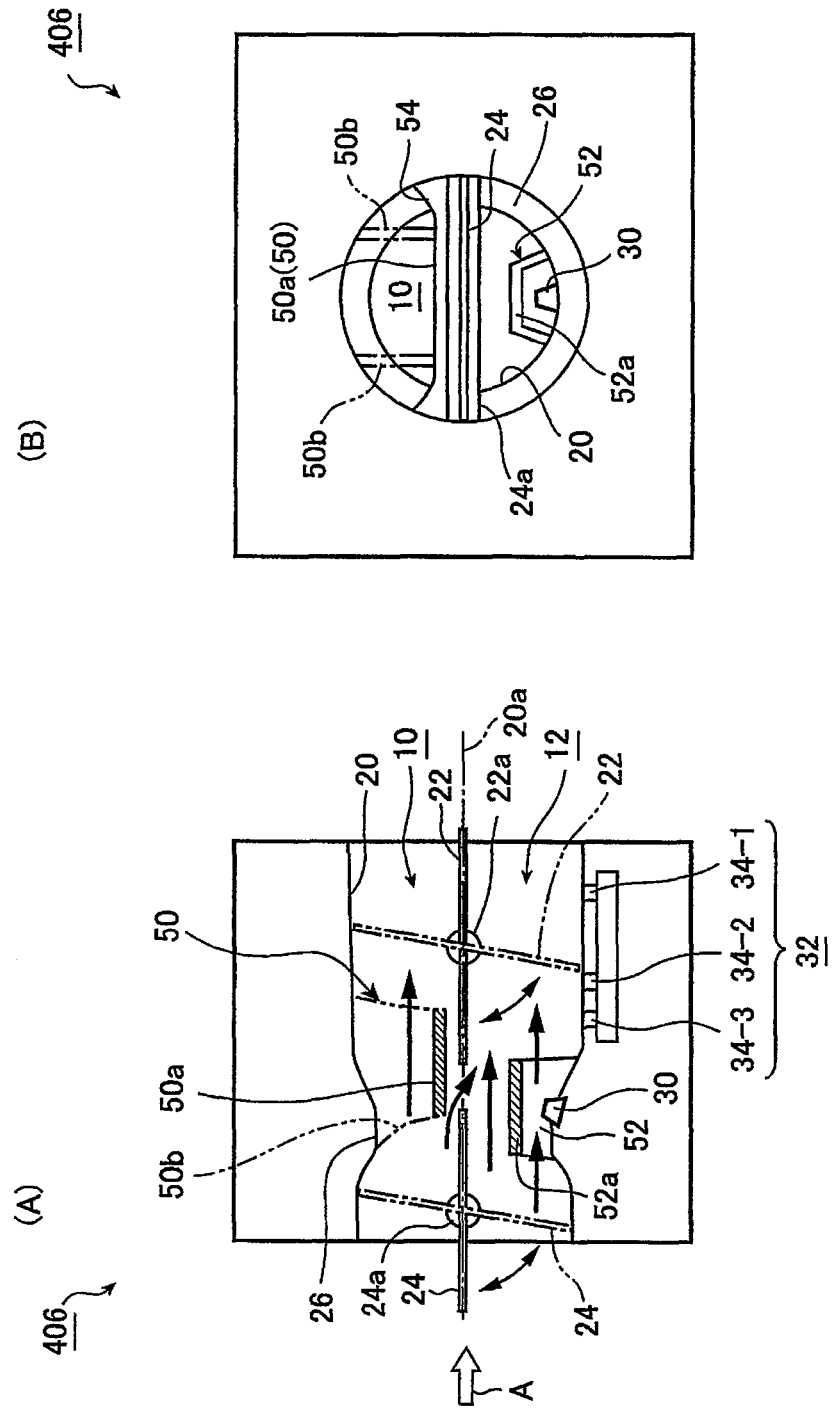

FIGS. 7 and 8 illustrate carburetors 405 and 406 according to fifth and sixth embodiments. The carburetors 405 and 406 according to the fifth and sixth embodiments include a second air flow guiding member 52, and the second air flow guiding member 52 is arranged in the air-fuel mixture passage 12. The second air flow guiding member 52 has a tunnel shape that extends straight in the flow direction A of the intake air. The cross-sectional shape of the second air flow guiding member 52 may be defined as appropriate.

The illustrated carburetors 405 and 406 according to the fifth and sixth embodiments include the above-described first air flow guiding member 50 whose functions and effects have been described above.

Figure 9:
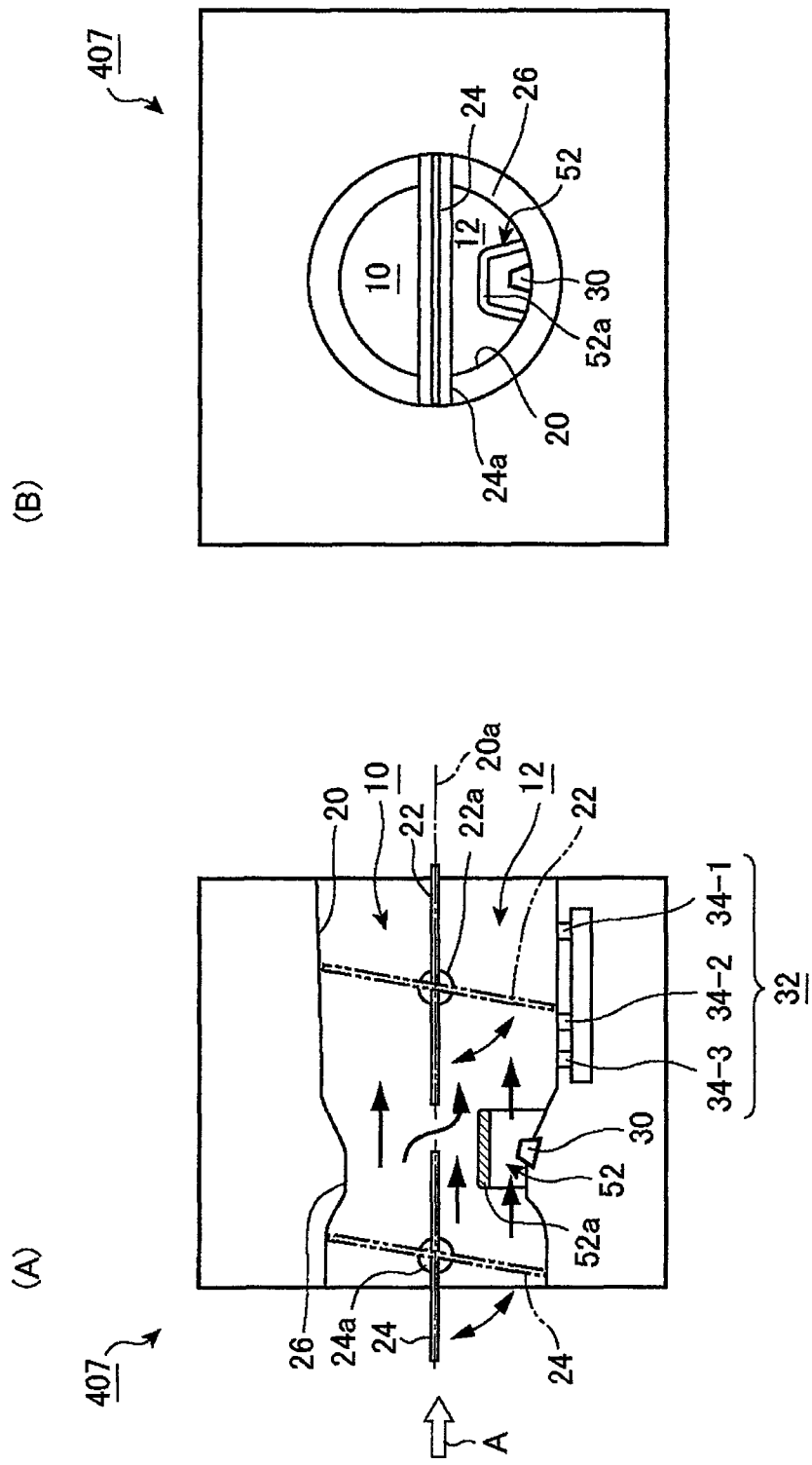

The second air flow guiding member 52 is arranged in a position in association with the main nozzle 30. The main nozzle 30 may be a main port. When described with reference to the carburetors illustrated in FIGS. 7 to 9, the main nozzle 30 is arranged in an intermediate portion in the longitudinal direction of the second air flow guiding member 52.

The second air flow guiding member 52 sends downstream the whole amount of the fuel discharged from the main nozzle 30 by virtue of the air flow created by the second air flow guiding member 52. As long as this function is effective, any relative positions of the main nozzle 30 and the second air flow guiding member 52 with respect to each other may be employed. For example, the second air flow guiding member 52 may be arranged such that the main nozzle 30 is positioned near the upstream end of the second air flow guiding member 52.

The downstream end of the second air flow guiding member 52 may be positioned between the choke valve 24 and the throttle valve 22 (FIG. 7), or may be positioned at a position at which it overlaps with the upstream-side end of the throttle valve 22 (FIG. 8). It should be noted that it is necessary to design the length of the second air flow guiding member 52 such that the downstream end of the second air flow guiding member 52 does not interfere with opening/closing of the throttle valve 22.

A third air flow guiding member 54, which is illustrated in FIG. 7 as one example, may be provided in the carburetors 405 and 406 according to the fifth and sixth embodiments. The third air flow guiding member 54 has a plate-like shape arranged in the air-fuel mixture passage 12. Specifically, the third air flow guiding member 54 is arranged below and near the choke valve 24, and arranged in parallel with the choke valve 24 in its fully-opened state.

The lower surface of the plate-like third air flow guiding member 54 is positioned below the choke valve shaft 24a. The upstream-side end of the third air flow guiding member 54 may optionally be positioned near the choke valve shaft 24a. The third air flow guiding member 54 may optionally extend to the downstream side to a larger extent than the downstream-side edge of the choke valve 24. It should be noted that it is necessary to design the length of the third air flow guiding member 54 such that the downstream end of the third air flow guiding member 54 does not interfere with opening/closing of the throttle valve 22.

The above-described third air flow guiding member 54 may be provided in the carburetors 401 to 404 of the above-described first to fourth embodiments.

The carburetors 405 and 406 according to the fifth and sixth embodiments (FIGS. 7 and 8) makes it possible to prevent the whole amount of the fuel discharged via the main nozzle 30 from being diffused from the air-fuel mixture passage 12 to the fresh air passage 10 in the carburetor by virtue of the tunnel-shaped second air flow guiding member 52. In other words, the whole amount of the fuel discharged from the main nozzle 30 is allowed to be directed from the air-fuel mixture passage 12 in the carburetor to the engine side.

In addition, by virtue of the plate-like third air flow guiding member 54 arranged below and near the choke valve 24, it is made possible to adjust the flow of gas in the air-fuel mixture passage 12 in the carburetor such that the gas flows along the axis 20a of the intake air passage 20, and thereby prevent entry of the air-fuel mixture flowing in the air-fuel mixture passage 12 into the fresh air passage 10 in the carburetor.

Although the carburetors 405 and 406 of the above-described fifth and sixth embodiments (FIGS. 7 and 8) include the first air flow guiding member 50 in the fresh air passage 10, the first air flow guiding member 50 may be omitted. Examples in which the first air flow guiding member 50 is omitted are illustrated in FIGS. 9 to 12.

Figure 10:
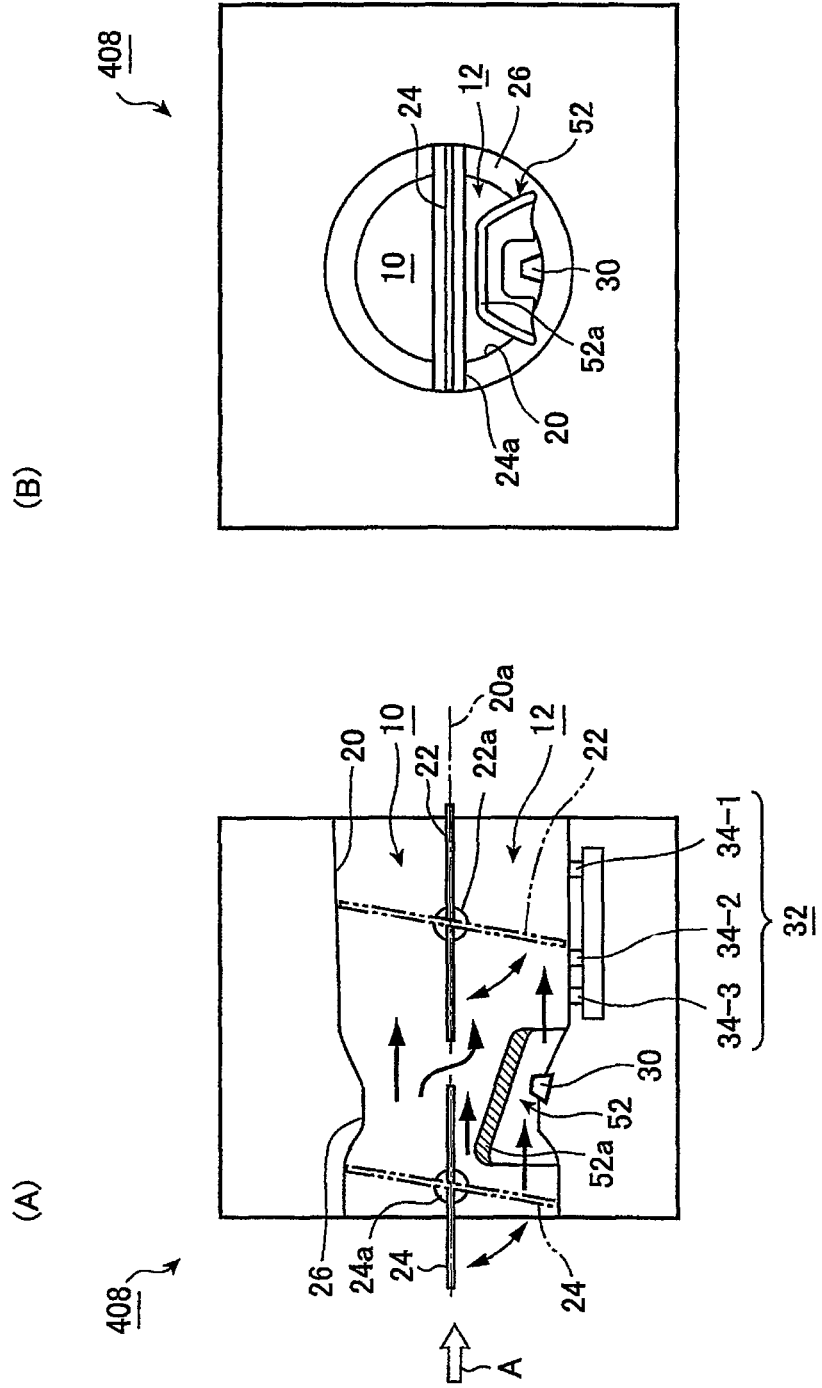

A carburetor 407 according to a seventh embodiment (FIG. 9) includes the above-described second air flow guiding member 52. With regard to the second air flow guiding member 52, the top plate part 52a is provided in parallel with the choke valve 24, but the top plate member 52a may be obliquely provided with respect to the axis 20a of the intake air passage 20 (FIG. 10). Specifically, as in the case of a carburetor 408 according to an eighth embodiment illustrated in FIG. 10, the top plate part 52a may be obliquely provided such that the top plate part 52a becomes more spaced away from the axis 20a as it extends toward the downstream side.

Figure 11:
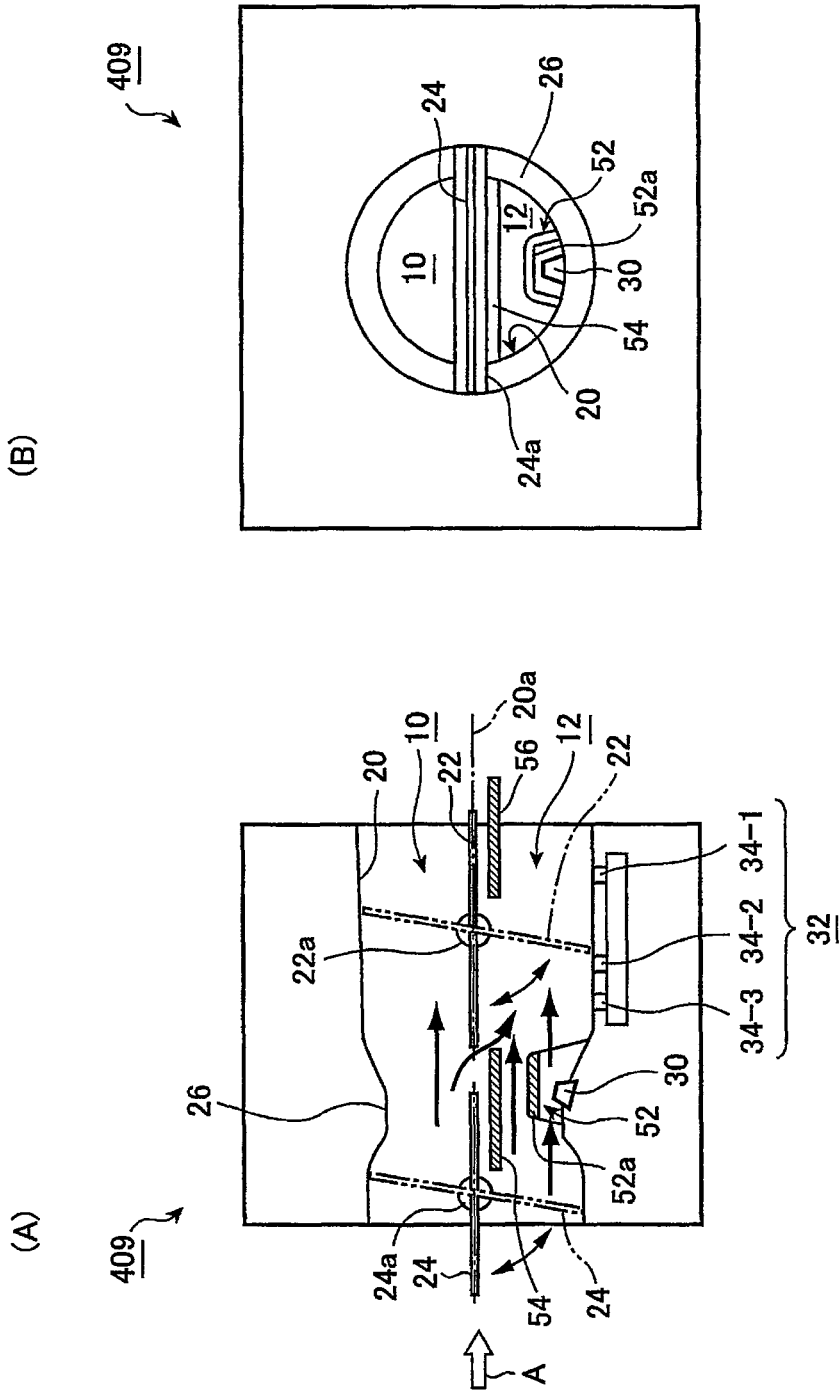

FIG. 11 illustrates a carburetor 409 according to a ninth embodiment. The carburetor 409 according to the ninth embodiment includes the above-described second and third air flow guiding members 52 and 54. The top plate part 52a of the second air flow guiding member 52 illustrated in FIG. 11 is in parallel with the choke valve 24, but there may be provided the inclined top plate part 52a described with reference to FIG. 10.

The carburetor 409 according to the ninth embodiment further includes a fourth air flow guiding member 56. The fourth air flow guiding member 56 has a plate-like shape, and extends in parallel with the throttle valve 22 such that it resides below and near the throttle valve 22. The lower surface of the fourth air flow guiding member 56 is positioned below the throttle valve shaft 22a.

By virtue of the plate-like fourth air flow guiding member 56, the flow of the air-fuel mixture in the air-fuel mixture passage 12 is adjusted. It will be appreciated that the fourth air flow guiding member 56 may be provided in other carburetors such as the carburetors 401 to 408 according to the first to eighth embodiments.

Figure 12:
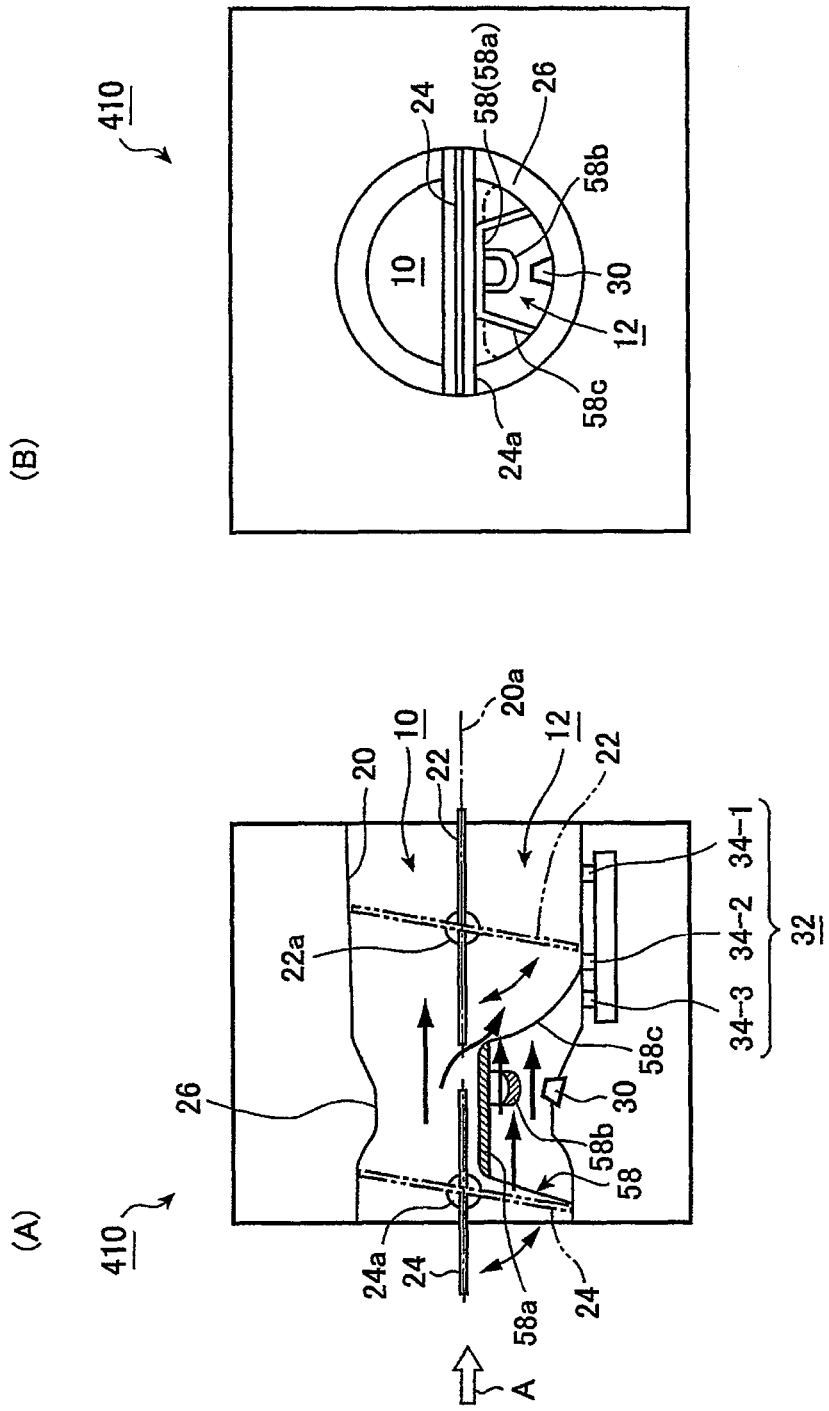

FIG. 12 illustrates a carburetor 410 according to a tenth embodiment. The carburetor 410 according to the tenth embodiment includes a fifth air flow guiding member 58 arranged in the air-fuel mixture passage 12. The fifth air flow guiding member 58 has a configuration integrating the above-described second air flow guiding member 52 and the third air flow guiding member 54. Specifically, the fifth air flow guiding member 58 includes a horizontal plate part 58a extending below and near the choke valve 24, and the horizontal plate part 58a extends from the vicinity of the choke valve shaft 24a to the vicinity of the upstream edge of the throttle valve 22.

The fifth air flow guiding member 58 includes a relatively short tunnel section 58b fixed to the horizontal plate part 58a. The tunnel section 58b is positioned to face the main nozzle 30. The lower surface of the tunnel section 58b is configured by a curved surface that is downward convex when the carburetor 410 is viewed in its longitudinal section.

In a modified example, the fifth air flow guiding member 58 may include right and left upright walls 58c, so that the above-described horizontal plate part 58a is coupled to the upper ends of the upright walls 58c.

The main nozzle 30 of the carburetors 407 to 410 according to the above-described seventh to tenth embodiment may be substituted by a main port.

Figure 13:
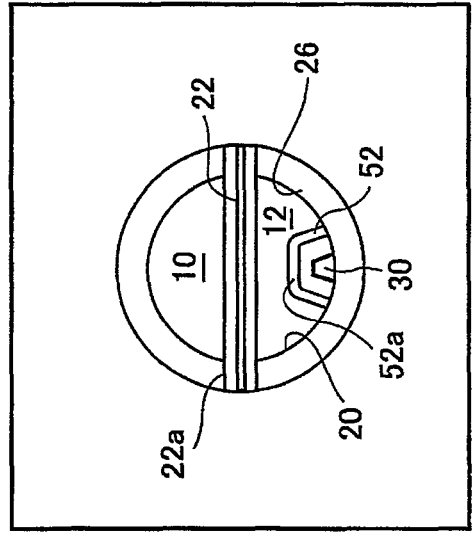
Figure 13:
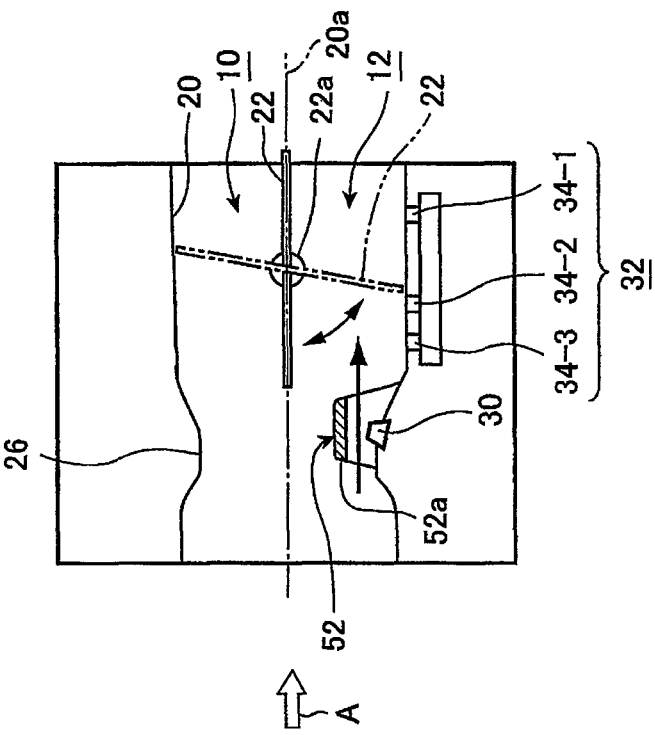

FIGS. 13 to 16 illustrate carburetors 411 to 414 according to eleventh to fourteenth embodiments that do not include a choke valve. Referring to FIG. 13, the carburetor 411 according to the eleventh embodiment includes the above-described second air flow guiding member 52 having the tunnel shape in the air-fuel mixture passage 12. The second air flow guiding member 52 may take any cross-sectional shape and length as appropriate, as discussed in the foregoing. The main nozzle 30 is positioned facing the second air flow guiding member 52. The main nozzle 30 may be substituted by a main port. The reference numeral 26 denotes the above-described venturi section, and the main nozzle 30 is arranged in the venturi section 26.

Figure 14:
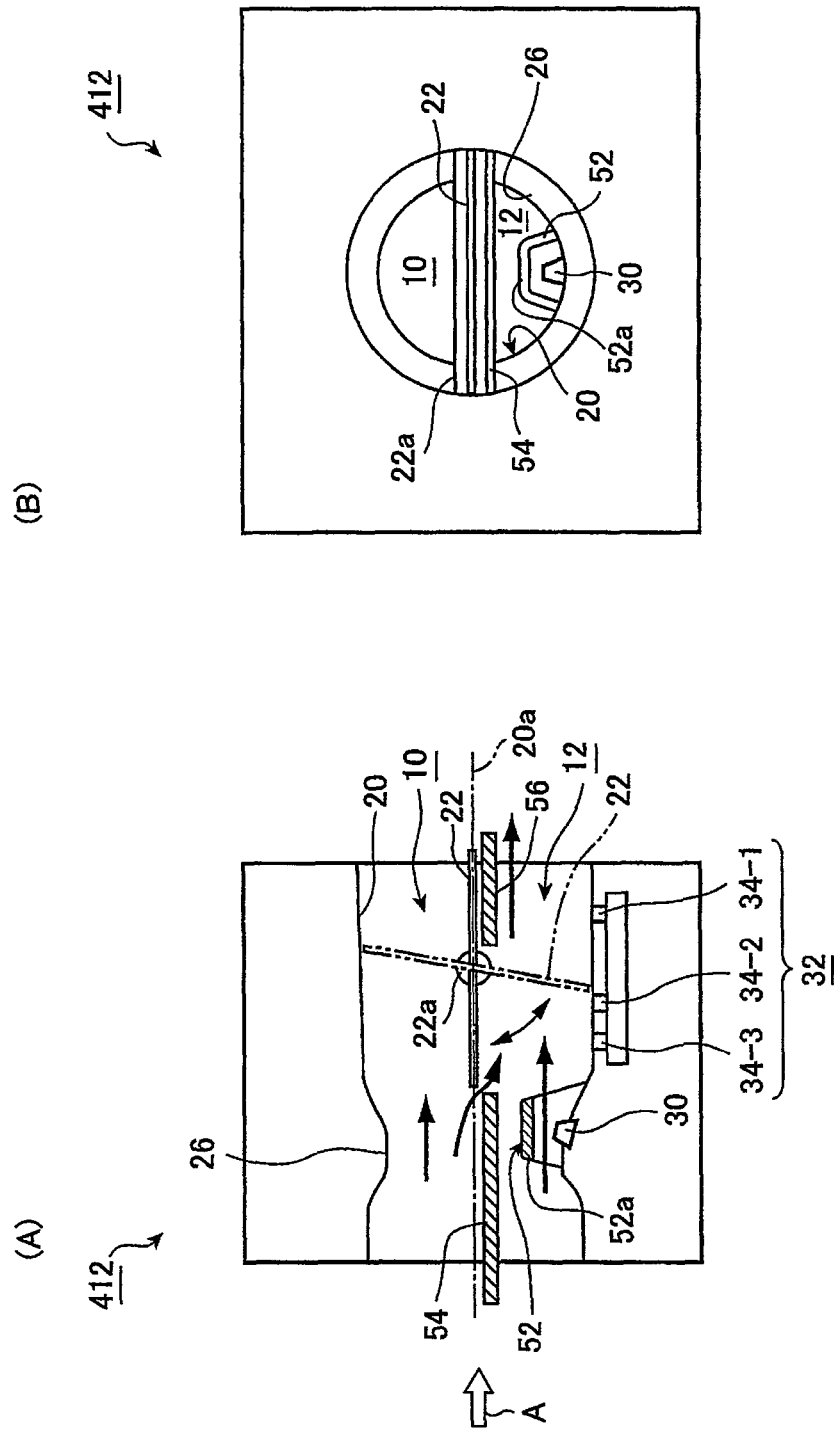

FIG. 14 illustrates the carburetor 412 according to the twelfth embodiment. The carburetor 412 according to the twelfth embodiment includes, in addition to the second air flow guiding member 52, the plate-like third and fourth air flow guiding members 54 and 56 as described above. It will be appreciated that either of the third and fourth air flow guiding members 54 and 56 may be omitted.

Figure 15:
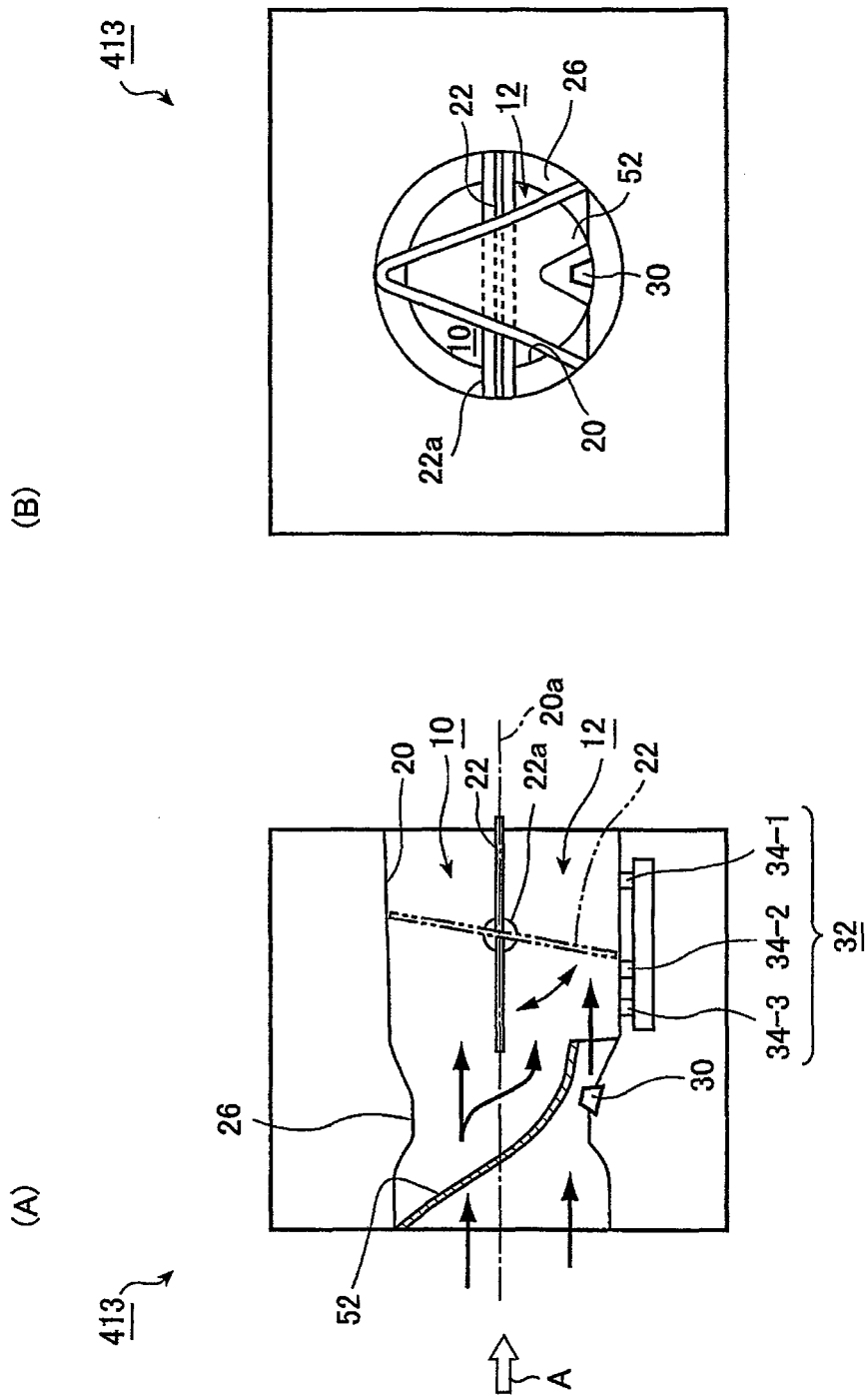

The tunnel-like second air flow guiding member 52 may take, as described above, any cross section and length as appropriate. An example thereof is illustrated in FIG. 15. The second air flow guiding member 52 provided in the carburetor 413 of the thirteenth embodiment illustrated in FIG. 15 has a length that extends from the upstream end of the carburetor 413 to a position where the second air flow guiding member 52 does not interfere with the throttle valve 22. In addition, the upstream end, which is an inlet, of the second air flow guiding member 52 has a shape widening from the upper end of the opening of the intake air passage 20 toward the lower end thereof. In the carburetor 413 according to the thirteenth embodiment, as can be appreciated from FIG. 15(B), the inlet and the outlet of the second air flow guiding member 52 have an inverted V shape, but their shapes are not limited to this exemplary shape. The second air flow guiding member 52 has a shape like a slope in which the ridge is inclined frontward and downward when viewed in a lateral direction.

According to the carburetor 413 of the thirteenth embodiment, the inlet of the second air flow guiding member 52 is larger than the outlet (downstream end) thereof, so that it is made possible to take in larger amount of air and thereby create the air-fuel mixture using the larger amount of air. In addition, the uniformity of the flow direction of the air-fuel mixture coming out of the second air flow guiding member 52 is effectively maintained.

Figure 16:
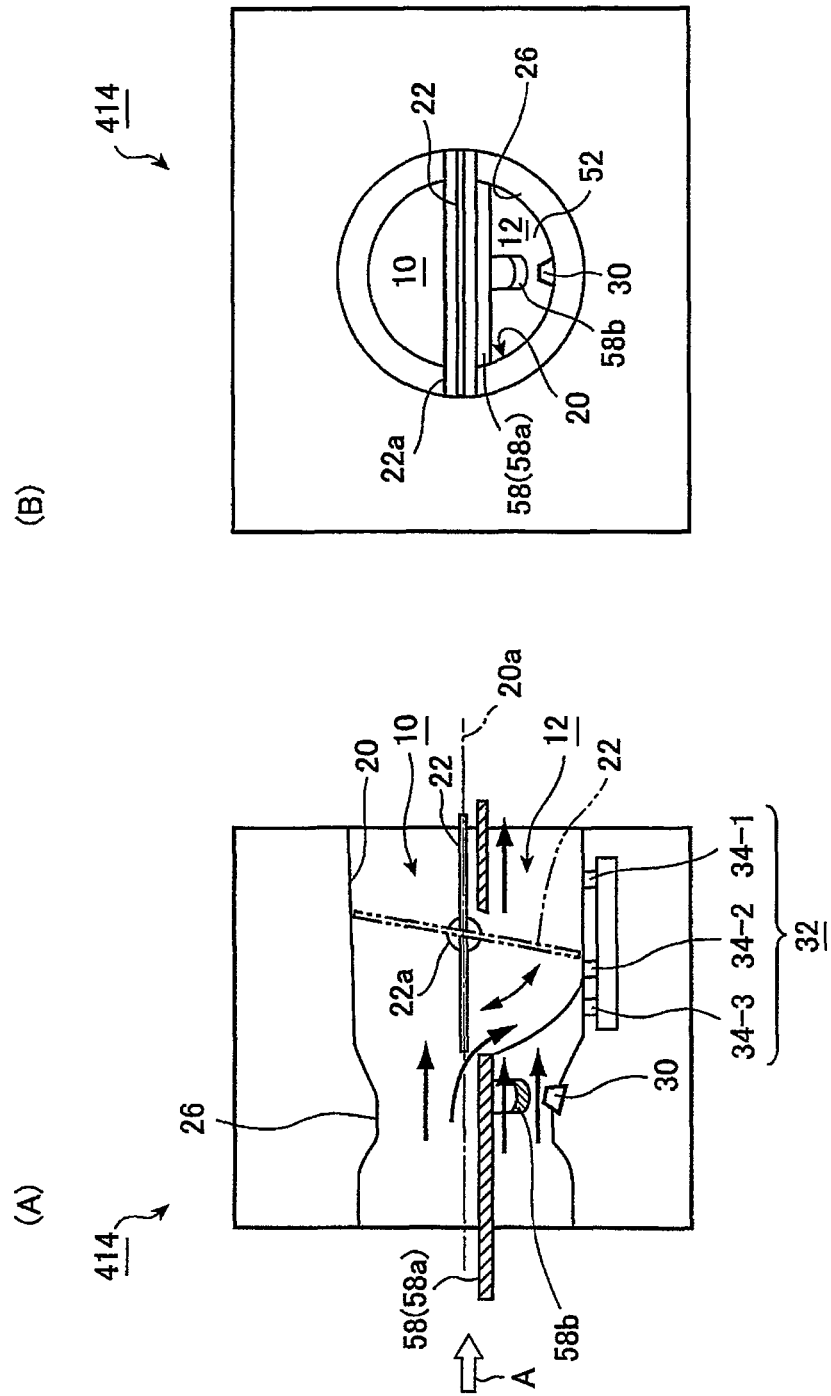

FIG. 16 illustrates the carburetor 414 according to the fourteenth embodiment. The carburetor 414 according to the fourteenth embodiment includes the above-described fifth air flow guiding member 58 (FIG. 12). Any position of the upstream end of the horizontal plate part 58a of the fifth air flow guiding member 58 may be employed as appropriate; for example, the upstream end of the horizontal plate part 58a may protrude outward from the upstream end of the carburetor 414 as illustrated in this figure. It will also be appreciated that the upstream end of the horizontal plate part 58a may coincide with the upstream end of the carburetor 414.

The main nozzle 30 of the carburetors 411 to 414 (FIGS. 13 to 16) without the choke valve according to the above-described eleventh to fourteenth embodiments may be substituted by a main port. In addition, although the carburetors 411 to 414 according to the eleventh to fourteenth embodiments include the venturi section 26, the venturi section 26 may be omitted. Experiments demonstrate that the carburetors 411 to 414 sufficiently exert their effective functions in the absence of the venturi section.

Figure 17:
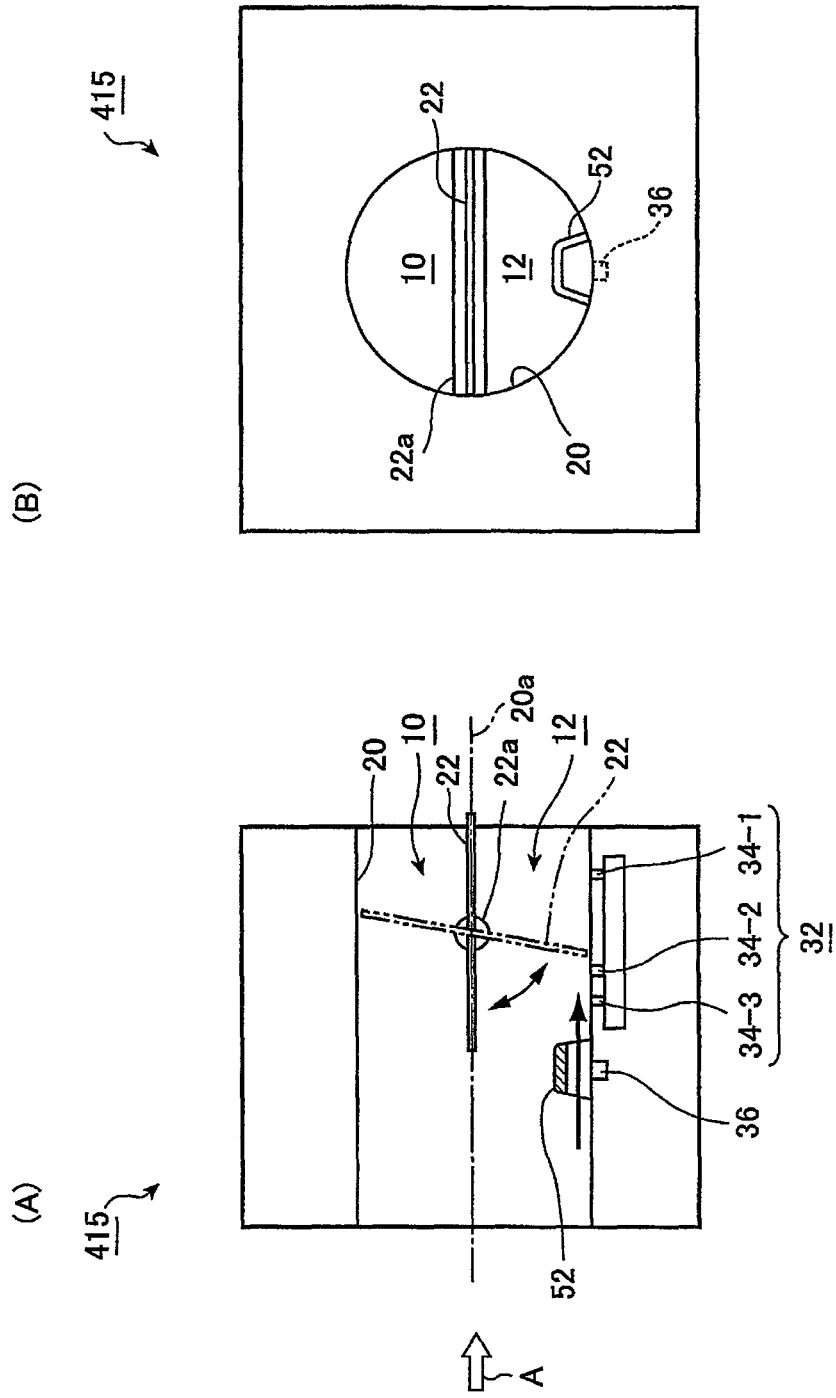
Figure 18:
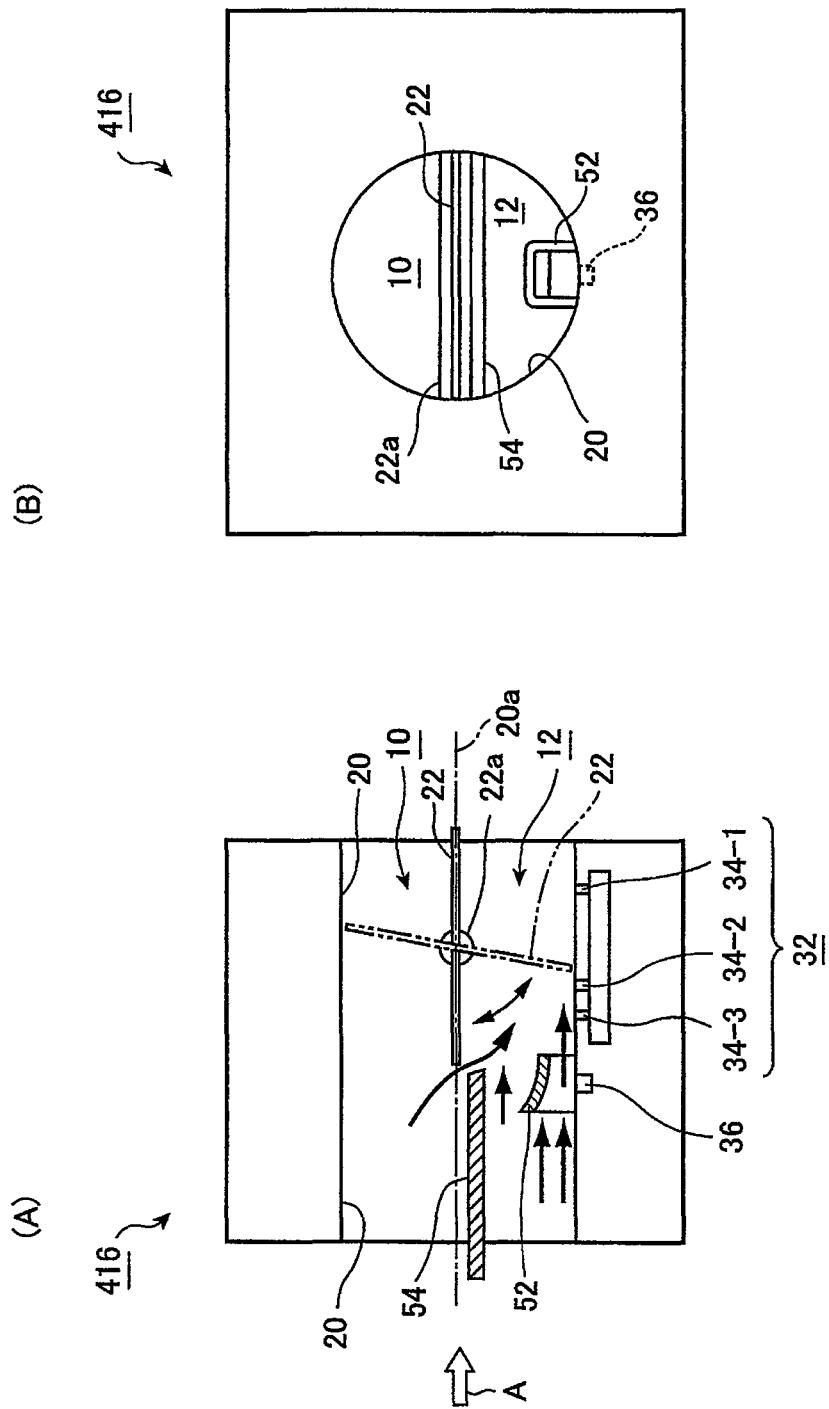
Figure 19:
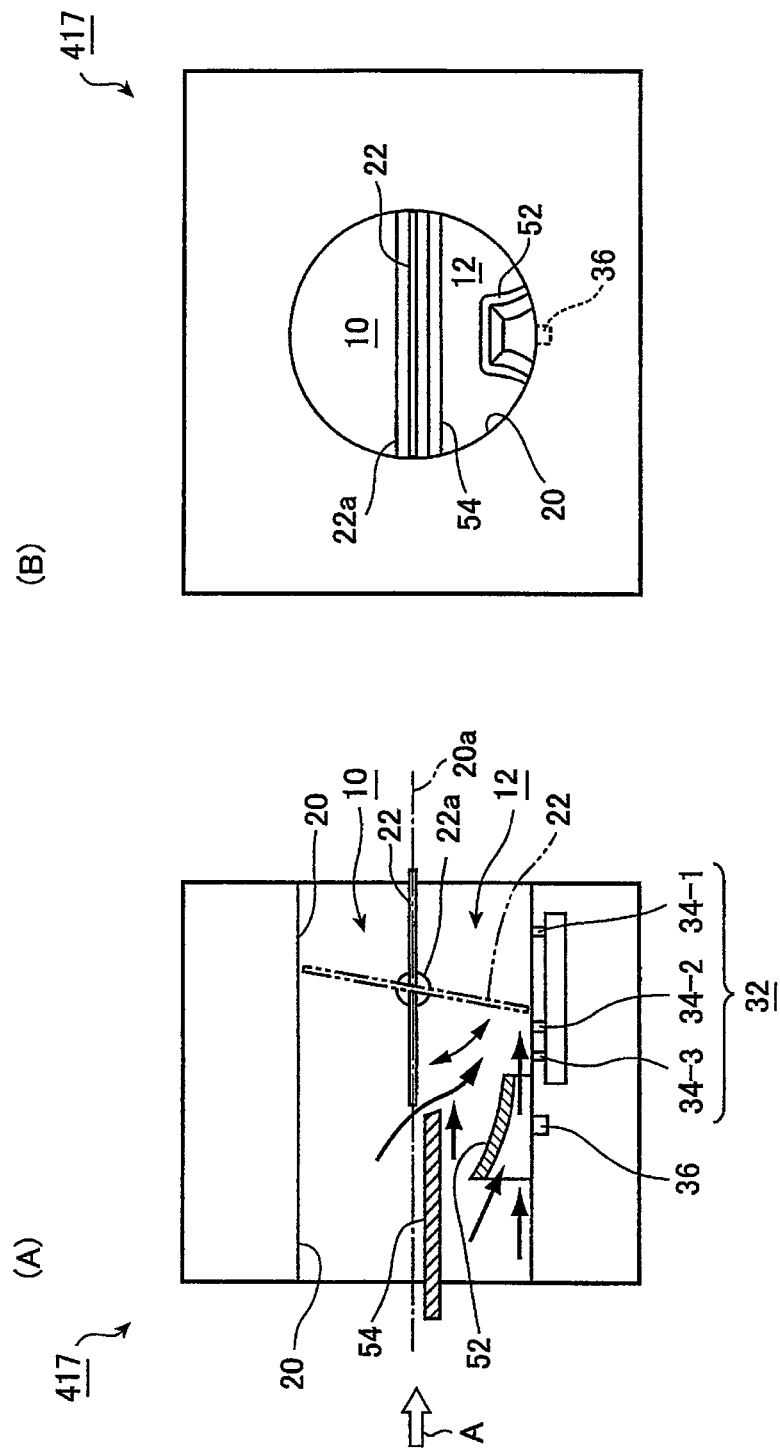
Figure 20:
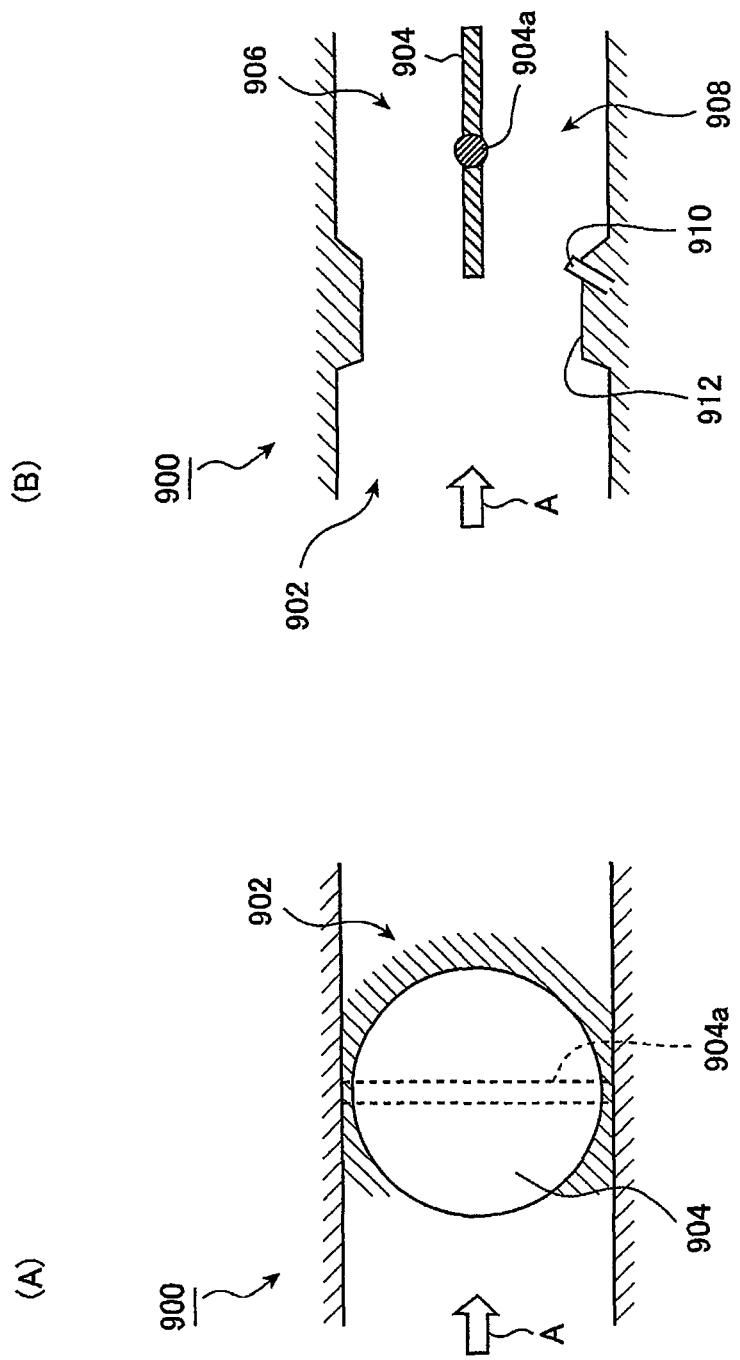

FIGS. 17 to 19 illustrate carburetors 415 to 417 that do not include a venturi section. FIG. 17 illustrates the carburetor 415 according to the fifteenth embodiment. The carburetor 415 according to the fifteenth embodiment adopts the above-mentioned main port. The reference numeral 36 in FIG. 17 denotes the main port. In the carburetor 415 according to the fifteenth embodiment, the second air flow guiding member 52 is arranged to face the main port 36.

FIG. 18 illustrates a carburetor 416 according to a sixteenth embodiment. The second air flow guiding member 52 included in the carburetor 416 according to the sixteenth embodiment has a tapered shape, so that the outlet on the downstream side is smaller than the inlet on the upstream side. By virtue of this configuration, it is made possible to effectively maintain the uniformity of the direction in which the air-fuel mixture coming out of the second air flow guiding member 52 flows, which is the flow direction of the air-fuel mixture. In addition, the carburetor 416 according to the sixteenth embodiment includes the above-described plate-like third air flow guiding member 54 positioned on the upstream side of the throttle valve 22. The downstream end of the third air flow guiding member 54 is positioned at a position that is near the throttle valve 22 but does not interfere with the throttle valve 22. Any position of the upstream end of the third air flow guiding member 54 may be employed as appropriate; for example, the upstream end of the third air flow guiding member 54 may be positioned at a position in alignment with the upstream end of the carburetor 416. Meanwhile, in this embodiment, the upstream end of the third air flow guiding member 54 is positioned at a position such that the upstream end protrudes more upstream than the upstream end of the carburetor 416.

FIG. 19 illustrates a carburetor 417 according to a seventeenth embodiment. The carburetor 417 according to the seventeenth embodiment includes, in addition to the second air flow guiding member 52, the above-described plate-like third air flow guiding member 54. In addition, the second air flow guiding member 52 provided in the carburetor 417 according to the seventeenth embodiment is relatively elongated, and the downstream-side outlet of the second air flow guiding member 52 is smaller than the upstream-side inlet thereof.

FIGS. 17 to 19 mentioned above disclose the carburetors 415 to 417 according to the fifteenth to seventeenth embodiments that do not include the venturi section. Nevertheless, these carburetors 415 to 417 according to the fifteenth to seventeenth embodiments may include the venturi section. In addition, although the carburetors 415 to 417 according to the fifteenth to seventeenth embodiments include the main port 36, the carburetors 415 to 417 may include the above-described main nozzle 30 instead of the main port 36.

In any one of the above-described carburetors 401 to 417, when the throttle valve 22 is fully opened, a portion of the air of the intake air that entered the intake air passage 20, that is, a portion of air flowing through the fresh air passage 10 is allowed to enter the air-fuel mixture passage 12 from the upstream side of the throttle valve 22. Thus, it is made possible to increase the amount of air-fuel mixture supplied to the engine.

While the invention has been described with reference to the specific exemplary embodiment, it will be apparent to those skilled in the art that various changes and modifications can be made to the specific embodiment without departing from the spirit and scope of the invention as defined in the claims.

REFERENCE SIGNS LIST

A Flow of gas in an intake air passage
1 Stratified scavenging engine
4 Carburetor
10 Fresh air passage
12 Air-fuel mixture passage
14 Crankcase
16 Piston
18 Combustion chamber
20 Intake air passage
20a Axis of intake air passage
22 Throttle valve
22a Throttle valve shaft
24 Choke valve
24a Choke valve shaft
26 Venturi section
30 Main nozzle
36 Main port
50 First air flow guiding member
52 Second air flow guiding member (tunnel shape)
54 Plate-like third air flow guiding member
56 Plate-like fourth air flow guiding member
58 Fifth air flow guiding member

What is claimed is:

1. A carburetor for a stratified scavenging engine, the carburetor comprising:
    an intake air passage configured to receive air filtered by an air cleaner and create an air-fuel mixture;
    a throttle valve arranged in the intake air passage, the throttle valve being a butterfly valve, wherein, in response to the throttle valve being placed in a fully-opened state, a fresh air passage and an air-fuel mixture passage are formed by the throttle valve, air coming out of the fresh air passage being supplied to an upper portion of a scavenging passage of the stratified scavenging engine, and an air-fuel mixture coming out of the air-fuel mixture passage being supplied to a crankcase of the stratified scavenging engine; and a first air flow guiding member configured to adjust a flow of gas passing through the fresh air passage and/or the air-fuel mixture passage and direct the flow of gas toward a downstream side, wherein the carburetor further comprises a main nozzle or a main port for supplying fuel to the intake air passage and at least one idle port for supplying fuel to the intake air passage with the at least one idle port located on a side downstream of the main nozzle or main port, wherein the first air flow guiding member is arranged in the fresh air passage and configured to adjust the flow of the gas passing through the fresh air passage, an upper surface of the first air flow guiding member is positioned above a shaft of the throttle valve, the main nozzle or main port is arranged in an intermediate position in a longitudinal direction of the first air flow guiding member.

2. The carburetor for a stratified scavenging engine according to claim 1, wherein the air coming out of the fresh-air passage is supplied via a piston groove to the upper portion of the scavenging passage.

3. The carburetor for a stratified scavenging engine according to claim 1, further comprising a second air flow guiding member being arranged to face a main nozzle or a main port for supplying fuel to the intake air passage.

4. The carburetor for a stratified scavenging engine according to claim 3, further comprising a third air flow guiding member being arranged in the air-fuel mixture passage, wherein the third air flow guiding member is formed in a plate-like shape; and a surface of the third air flow guiding member in contact with the air-fuel mixture passage is positioned to be lower than a shaft of the throttle valve.

5. The carburetor for a stratified scavenging engine according to claim 4, wherein the third air flow guiding member is inclined downward from an upstream side toward the downstream side.

6. The carburetor for a stratified scavenging engine according to claim 3, wherein the second air flow guiding member is formed in a shape of a tunnel extending in a flow direction of intake air.

7. The carburetor for a stratified scavenging engine according to claim 6, wherein an inlet of the second air flow guiding member is larger than an outlet of the second air flow guiding member.

8. The carburetor for a stratified scavenging engine according to claim 1, further comprising a choke valve which is a butterfly valve.

9. The carburetor for a stratified scavenging engine according to claim 8, wherein the first air flow guide member is arranged in the fresh air passage; and a surface of the first air flow guiding member in contact with the fresh air passage is positioned above a shaft of the choke valve and a shaft of the throttle valve.

10. The carburetor for a stratified scavenging engine according to claim 8, further comprising an additional air flow guiding member that is arranged in the air-fuel mixture passage, wherein the throttle valve includes a shaft;

the additional air flow guiding member is formed in a plate-like shape;

the additional air flow guiding member is positioned such that the additional air flow guiding member resides below and near the throttle valve; and a surface of the additional air flow guiding member in contact with the air-fuel mixture passage is positioned lower than the shaft of the throttle valve.

* * * * *